(12) United States Patent
Guthrie et al.

(10) Patent No.: US 11,996,977 B2
(45) Date of Patent: *May 28, 2024

(54) SYSTEM AND METHOD FOR AUTOMATED INFORMATION TECHNOLOGY SERVICES MANAGEMENT

(71) Applicant: CDW LLC, Vernon Hills, IL (US)

(72) Inventors: Jeremy Guthrie, Fitchburg, WI (US); Jason Owens, Brookfield, WI (US)

(73) Assignee: CDW LLC, Vernon Hills, IL (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/839,291

(22) Filed: Jun. 13, 2022

(65) Prior Publication Data

US 2022/0311661 A1 Sep. 29, 2022

Related U.S. Application Data

(63) Continuation of application No. 16/160,449, filed on Oct. 15, 2018, now Pat. No. 11,362,889.

(51) Int. Cl.
*H04L 9/40* (2022.01)
*G06F 15/16* (2006.01)
(Continued)

(52) U.S. Cl.
CPC ...... *H04L 41/0803* (2013.01); *H04L 12/4633* (2013.01); *H04L 63/0428* (2013.01); *H04L 63/029* (2013.01); *H04L 67/10* (2013.01)

(58) Field of Classification Search
CPC ............. H04L 41/0803; H04L 63/0428; H04L 12/4633; H04L 63/029; H04L 67/10
(Continued)

(56) References Cited

U.S. PATENT DOCUMENTS 7,792,801 B2 * 9/2010 Hamilton, II ...... G06Q 30/0627
707/655
8,683,075 B1 * 3/2014 Joffe ...................... G06F 9/505
709/238

(Continued)

FOREIGN PATENT DOCUMENTS

JP 2011119793 A 6/2011
WO WO-2015/179310 A1 11/2015

OTHER PUBLICATIONS

International Search Report and Written Opinion for Application No. PCT/US2019/055459, dated Jan. 24, 2020.

*Primary Examiner* — Zi Ye
*Assistant Examiner* — Berhanu Shitayewoldetadik
(74) *Attorney, Agent, or Firm* — MARSHALL, GERSTEIN & BORUN LLP; Randall G. Rueth

(57) ABSTRACT

A computer-implemented method includes receiving a selection of an information technology service; initializing a machine avatar; establishing a network tunnel; and receiving network traffic. A computing system comprising: one or more processors; and memory storing instructions that, when executed by the one or more processors, cause the computing system to: receive a selection of an information technology service; initialize a machine avatar; establish a network tunnel; and receive network traffic. A non-transitory computer readable medium containing program instructions that when executed, cause a computer to: receive a selection of an information technology service; initialize a machine avatar; establish a network tunnel; and receive network traffic.

19 Claims, 15 Drawing Sheets

(51) Int. Cl.
  *H04L 12/24* (2006.01)
  *H04L 12/46* (2006.01)
  *H04L 15/16* (2006.01)
  *H04L 29/06* (2006.01)
  *H04L 29/08* (2006.01)
  *H04L 41/0803* (2022.01)
  *H04L 67/10* (2022.01)

(58) Field of Classification Search
  USPC .......................................................... 709/223
  See application file for complete search history.

(56) References Cited

U.S. PATENT DOCUMENTS

| | | | |
|---|---|---|---|
| 9,408,537 B2* | 8/2016 | Schroeter | A61B 5/01 |
| 9,886,710 B2* | 2/2018 | Melcher | H04W 84/18 |
| 9,904,568 B2* | 2/2018 | Vincent | H04L 12/4633 |
| 10,402,731 B1 | 9/2019 | Cosic | |
| 10,607,134 B1 | 3/2020 | Cosic | |
| 2002/0029276 A1* | 3/2002 | Bendinelli | H04L 12/4641 |
| | | | 709/227 |
| 2004/0023723 A1* | 2/2004 | Jandel | H04L 29/06 |
| | | | 463/42 |
| 2005/0210150 A1* | 9/2005 | Bahl | H04L 29/12066 |
| | | | 709/245 |
| 2006/0136570 A1* | 6/2006 | Pandya | H04L 63/20 |
| | | | 709/217 |
| 2006/0224712 A1* | 10/2006 | Aho | H04L 41/0803 |
| | | | 709/223 |
| 2007/0050716 A1* | 3/2007 | Leahy | H04L 67/306 |
| | | | 715/706 |
| 2009/0113066 A1* | 4/2009 | Van Wie | H04L 12/1827 |
| | | | 709/231 |
| 2009/0276771 A1 | 11/2009 | Nickolov et al. | |
| 2010/0058485 A1* | 3/2010 | Gonzalez | G06F 21/10 |
| | | | 726/27 |
| 2010/0105484 A1 | 4/2010 | Horneff et al. | |
| 2010/0198924 A1* | 8/2010 | Collet | G10L 15/26 |
| | | | 709/206 |
| 2011/0087968 A1* | 4/2011 | Lakshmanan | G06Q 10/10 |
| | | | 715/751 |
| 2011/0107406 A1 | 5/2011 | Frost et al. | |
| 2011/0153697 A1* | 6/2011 | Nickolov | G06F 9/4856 |
| | | | 707/827 |
| 2011/0179136 A1* | 7/2011 | Twitchell, Jr. | H04L 47/15 |
| | | | 709/217 |
| 2012/0215900 A1* | 8/2012 | Moyers | H04L 65/1069 |
| | | | 709/223 |
| 2012/0226987 A1* | 9/2012 | Wie | H04L 41/22 |
| | | | 715/736 |
| 2012/0281708 A1 | 11/2012 | Chauhan et al. | |
| 2013/0022193 A1* | 1/2013 | Shafique | H04M 15/62 |
| | | | 379/229 |
| 2013/0091213 A1* | 4/2013 | Diab | G06Q 50/01 |
| | | | 709/204 |
| 2013/0212228 A1* | 8/2013 | Butler | H04L 65/605 |
| | | | 709/219 |
| 2013/0227437 A1* | 8/2013 | Brody | H04L 12/1822 |
| | | | 715/757 |
| 2013/0322451 A1* | 12/2013 | Wang | H04L 45/306 |
| | | | 370/392 |
| 2013/0346883 A1* | 12/2013 | Shuster | G06T 19/20 |
| | | | 715/757 |
| 2014/0047534 A1* | 2/2014 | Tse | H04L 63/0272 |
| | | | 726/13 |
| 2014/0052864 A1* | 2/2014 | Van Der Linden | G06F 9/5077 |
| | | | 709/226 |
| 2014/0115144 A1* | 4/2014 | Guest | H04L 67/10 |
| | | | 709/224 |
| 2014/0115502 A1* | 4/2014 | Van Wie | H04L 67/24 |
| | | | 715/757 |
| 2014/0137267 A1* | 5/2014 | Keitel | H04L 63/0272 |
| | | | 726/27 |
| 2014/0211944 A1* | 7/2014 | Hayward | H04L 9/0866 |
| | | | 380/281 |
| 2014/0280476 A1* | 9/2014 | Chiussi | G06F 8/36 |
| | | | 709/203 |
| 2014/0280952 A1* | 9/2014 | Shear | H04L 47/70 |
| | | | 709/226 |
| 2014/0282586 A1* | 9/2014 | Shear et al. | H04L 47/70 |
| | | | 718/104 |
| 2014/0351812 A1* | 11/2014 | Imai | G06F 9/45533 |
| | | | 718/1 |
| 2015/0089222 A1* | 3/2015 | White | H04L 63/0428 |
| | | | 713/168 |
| 2015/0156183 A1* | 6/2015 | Beyer | H04L 29/06 |
| | | | 726/4 |
| 2015/0222480 A1 | 8/2015 | Gan et al. | |
| 2015/0281234 A1* | 10/2015 | Sylvain | H04L 63/061 |
| | | | 726/1 |
| 2015/0371548 A1 | 12/2015 | Samid | |
| 2015/0378765 A1* | 12/2015 | Singh | G06F 9/45558 |
| | | | 718/1 |
| 2015/0379623 A1* | 12/2015 | Gadre | G06Q 30/0641 |
| | | | 705/27.2 |
| 2016/0035061 A1* | 2/2016 | Gadre | G06T 1/20 |
| | | | 345/473 |
| 2016/0042402 A1* | 2/2016 | Gadre | G06Q 30/0276 |
| | | | 705/14.66 |
| 2016/0191673 A1* | 2/2016 | Bohannon | H04L 67/2861 |
| | | | 709/213 |
| 2016/0063588 A1* | 3/2016 | Gadre | G06F 16/9537 |
| | | | 705/26.61 |
| 2016/0196596 A1* | 7/2016 | Van Wie | H04N 7/157 |
| | | | 705/26.41 |
| 2016/0255667 A1* | 9/2016 | Sschwartz | H04W 76/12 |
| | | | 455/445 |
| 2016/0269237 A1* | 9/2016 | Higgins | H04L 63/10 |
| 2016/0306939 A1* | 10/2016 | Schroeter | A61B 5/4842 |
| 2017/0173262 A1 | 6/2017 | Veltz | |
| 2017/0236176 A1* | 8/2017 | Johansson | G06Q 30/0613 |
| | | | 705/7.13 |
| 2018/0091596 A1* | 3/2018 | Alvarez | H04L 67/12 |
| 2018/0120928 A1* | 5/2018 | Hayashida | G06F 3/011 |
| 2018/0285794 A1* | 10/2018 | Gray-Donald | G06F 9/5038 |
| 2018/0337782 A1 | 11/2018 | Wu et al. | |
| 2019/0056720 A1* | 2/2019 | Clark | H04L 63/0428 |
| 2019/0057714 A1* | 2/2019 | Scholar | G10L 13/08 |
| 2019/0141043 A1* | 5/2019 | Higgins | H04L 63/10 |
| 2019/0149365 A1* | 5/2019 | Chatterjee | H04L 5/0092 |
| | | | 370/329 |

* cited by examiner

```
[host root 14:10:07] /home/user # sshsetup-4.0 --help
`sshsetup` starts, stops and displays status of port forwards and tunnels Usage:
    sshsetup --start [--abbrev=custa] [--bmn_name=custa-s-bmn01] [--instance=0-255|--tunnel]
    sshsetup --restart [--abbrev=custa] [--bmn_name=custa-s-bmn01] [--instance=0-255|--tunnel]
    sshsetup --stop [--abbrev=custa] [--bmn_name=custa-s-bmn01] [--instance=0-255|--tunnel] [--force]
    sshsetup --status [--abbrev=custa] [--bmn_name=custa-s-bmn01] [--instance=0-255|--tunnel]
    sshsetup --activate [--abbrev=custa] [--bmn_name=custa-s-bmn01] [--instance=0-255|--tunnel]
    sshsetup --deactivate [--abbrev=custa] [--bmn_name=custa-s-bmn01] [--instance=0-255|--tunnel]
    sshsetup --authenticate [--bmn_name=custa-s-bmn01]
    sshsetup --daemon
    sshsetup --pause
    sshsetup --unpause
    sshsetup --refresh [--bmn_name=custa-s-bmn01]
    sshsetup --remove [--bmn_name=custa-s-bmn01]
    sshsetup --cancel [--abbrev=custa] [--bmn_name=custa-s-bmn01] [--instance=0-255] [--remote_port=PORT]
[--remote_ip=IP] [--listening_port=PORT]
    sshsetup --forward [--abbrev=custa] [--bmn_name=custa-s-bmn01] [--instance=0-255] [--remote_port=PORT]
[--remote_ip=IP] [--listening_port=PORT]
```

FIG. 6A

```
[host root 14:10:07] /home/user # sshsetup-4.0 --status --abbrev=pmlab --bmn_name=pmlab-s-bmn03 --tunnel
BMN    | INSTANCE | STATUS | SSH_PID | EPHEMERAL_SOCK_ADDR  | LOCAL_SOCKET_ADDR | BMN_SOCKET_ADDR   | END_SYSTEM_SOCKET_ADDR
-------+----------+--------+---------+----------------------+-------------------+-------------------+------------------------
bmn03  | tun6     | up     | 10551   | 172.20.0.4:51758     | 172.20.16.14:*    | 172.20.16.15:*    | 172.19.0.10:*
bmn03  | tun6     | down   | 10551   | 172.20.0.4:51758     | 172.20.16.14:*    | 172.20.16.15:*    | 172.20.128.32/30:*
bmn03  | tun6     | up     | 10551   | 172.20.0.4:51758     | 172.20.16.14:*    | 172.20.16.15:*    | 172.19.128.41:*
```

FIG. 6B

```
[host root 14:10:07] /home/user # ifconfig tun6
tun6   link encap:UNSPEC  HWaddr 00-00-00-00-00-00-00-00-00-00-00-00-00-00-00-00
       inet addr 172.20.16.14 P-t-P: 172.20.16.15  Mask 255.255.255.0
       UP POINTTOPOINT RUNNING NOARP MULTICAST MTU:1300 Metric:1
       RX packets 105551951 bytes 132997446254 (123.8 GiB)
       RX errors 0  dropped 174 overruns 0  frame 0
       TX packets 34036841 bytes 10850946747 (10.1 GiB)
       TX errors 0  dropped 0 overruns 0  carrier 0  collisions 0
```

610 (command line)
612 (output block)

| BMN | INSTANCE | STATUS | SSH_PID | EPHEMERAL_SOCK_ADDR | LOCAL_SOCKET_ADDR | BMN_SOCKET_ADDR | END_SYSTEM_SOCKET_ADDR |
|---|---|---|---|---|---|---|---|
| bmn03 | 1 | up | 13892 | 172.20.0.4:62972 | 172.20.1.1:51770 | 61.72.50.175:22 | 1.2.3.4:7700 |
| bmn03 | 1 | up | 13892 | 172.20.0.4:62972 | 172.20.1.1:51725 | 61.72.50.175:22 | 1.2.3.5:7700 |
| bmn03 | 1 | up | 13892 | 172.20.0.4:62972 | 172.20.1.1:42098 | 61.72.50.175:22 | 5.5.5.5:80 |
| bmn03 | 1 | up | 13892 | 172.20.0.4:62972 | 172.20.1.1:42099 | 61.72.50.175:22 | 5.5.5.5:443 |
| bmn03 | 1 | up | 13892 | 172.20.0.4:62972 | 172.20.1.1:51769 | 61.72.50.175:22 | 1.2.3.3:7707 |
| bmn03 | 1 | up | 13892 | 172.20.0.4:62972 | 172.20.1.1:51724 | 61.72.50.175:22 | 1.2.3.2:7707 |
| bmn03 | 254 | up | 13886 | 172.20.0.4:62960 | 172.20.1.1:5009 | 61.72.50.175:22 | 172.16.15.30:3389 |
| bmn03 | 254 | up | 13886 | 172.20.0.4:62960 | 172.20.1.1:5007 | 61.72.50.175:22 | 127.0.0.1:48003 |
| bmn03 | 254 | up | 13886 | 172.20.0.4:62960 | 172.20.1.1:5008 | 61.72.50.175:22 | 127.0.0.1:444 |
| bmn03 | 254 | up | 13886 | 172.20.0.4:62960 | 172.20.1.1:5004 | 61.72.50.175:22 | 127.0.0.1:5432 |
| bmn03 | 254 | up | 13886 | 172.20.0.4:62960 | 172.20.1.1:5006 | 61.72.50.175:22 | 127.0.0.1:22 |
| bmn03 | 254 | up | 13886 | 172.20.0.4:62960 | 172.20.1.1:5005 | 61.72.50.175:22 | 127.0.0.1:389 |
| bmn03 | 255 | up | 13880 | 172.20.0.4:62931 | 127.0.0.1:2500 | 61.72.50.175:22 | 64.73.57.33:22 |
| bmn03 | 255 | up | 13880 | 172.20.0.4:62931 | 127.0.0.1:8089 | 61.72.50.175:22 | 192.168.42.166:25 |
| bmn03 | 255 | up | 13880 | 172.20.0.4:62931 | 127.0.0.1:8389 | 61.72.50.175:22 | 192.168.68.19:8089 |
| bmn03 | 255 | up | 13880 | 172.20.0.4:62931 | 127.0.0.1:8082 | 61.72.50.175:22 | 192.168.52.31:389 |
| bmn03 | 255 | up | 13880 | 172.20.0.4:62931 | 127.0.0.1:8080 | 61.72.50.175:22 | 192.168.42.176:8082 |
| bmn03 | 255 | up | 13880 | 172.20.0.4:62931 | 127.0.0.1:7998 | 61.72.50.175:22 | 192.168.42.187:80 |
| bmn03 | 255 | up | 13880 | 172.20.0.4:62931 | 127.0.0.1:18530 | 61.72.50.175:22 | 192.168.42.145:4739 |
| bmn03 | 255 | up | 13880 | 172.20.0.4:62931 | 127.0.0.1:8636 | 61.72.50.175:22 | 192.168.42.174:8530 |
| bmn03 | 255 | up | 13880 | 172.20.0.4:62931 | 127.0.0.1:8086 | 61.72.50.175:22 | 192.168.52.31:636 |
| bmn03 | 255 | up | 13880 | 172.20.0.4:62931 | 127.0.0.1:8083 | 61.72.50.175:22 | 192.168.53.60:443 |
| bmn03 | tun6 | up | 10551 | 172.20.0.4:51758 | 172.20.16.14:* | 172.20.16.15:* | 172.19.0.10:* |
| bmn03 | tun6 | down | 10551 | 172.20.0.4:51758 | 172.20.16.14:* | 172.20.16.15:* | 172.20.128.32/30:* |
| bmn03 | tun6 | up | 10551 | 172.20.0.4:51758 | 172.20.16.14:* | 172.20.16.15:* | 172.20.128.41:* |

SYSTEM AND METHOD FOR AUTOMATED INFORMATION TECHNOLOGY SERVICES MANAGEMENT

CROSS-REFERENCE TO RELATED APPLICATIONS

This application is a continuation of application Ser. No. 16/160,449, entitled SYSTEM AND METHOD FOR AUTOMATED INFORMATION TECHNOLOGY SERVICES MANAGEMENT, filed on Oct. 15, 2018, which is incorporated herein by reference in its entirety.

FIELD OF THE DISCLOSURE

The present disclosure generally relates to a system and method for automated information technology services management, and in particular, for generating machine avatars to enable combined remote infrastructure monitoring and management.

BACKGROUND

The background description provided herein is for generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Information technology (IT) includes the use of computers to store, transmit, and/or process information. IT is a critical component of most businesses in today's Internet-based economy. Traditionally, management and delivery of IT services has required IT services companies to physically manage business equipment (e.g., computers, telephones, mobile devices, software, data, etc.). For example, IT service providers have required direct physical access to their customers' respective computing environments. Physical access has generally required that 1) customer business equipment be positioned at a site remote from the customer's business (e.g., at the service provider's data center or the data center of a third party) and/or that 2) customers allow service providers physical access to customer business equipment on the premises of the customer. The physical access requirements have wasted time and resources of the IT service provider and the customer alike.

Prior attempts to facilitate remote administration of IT services have focused on an ad-hoc approach, and have been limited in scope/applicability. Prior attempts to facilitate remote administration of IT services have encountered numerous issues, including extensive initial and/or ongoing configuration requirements, high cost, the requirement to field complex hardware, security issues, data protection concerns, cloud computing incompatibilities, and overall inflexibility. Modern IT infrastructures are complex, heterogeneous computing environments, with complex networking capabilities. Yet existing approaches to facilitating remote administration of IT services lack a consistent, scalable framework.

Existing services and/or business equipment must be configured by hand before being deployed to a customer, and must be continually updated and reconfigured. IT service providers must create one-off hardware and/or software configurations for each customer, and the configurations are not reusable. IT service providers often ship pre-configured servers, laptops, and other full-profile computing equipment to customers. These pre-configured machines may include computer code and data that is proprietary to the IT service providers. This private code and data may be necessarily unsecured, and may expose IT service providers to cyber security threats/vulnerabilities, including hacking and theft of intellectual property. Prior attempts to automate the administration of IT services have been incompatible with cloud computing environments because the automation is intended to support traditional customer infrastructure, and not the cloud computing paradigm, wherein some computing resources may be provided by a third party. Recovering leased or loaned hardware and/or software for maintenance and/or service end-of-life are additional problems faced by IT service providers.

The prior attempts at automating the provision of IT services have also been less flexible. Historically, before the IT service management company can begin to administer services on behalf of the customer, the IT service company has been required to build a sample physical server, and to physically ship that sample physical server to the customer. The server may be costly to produce and may include valuable hardware and/or software assets. In addition, to provide geographic redundancy, multiple server computers may be required in multiple physical locations per customer. Each may need to be separately constructed and shipped. Moreover, the network interfaces of the individual servers may be configured for packet transmission and reception, requiring physical media reading/writing and kernel-space and/or super user access.

Prior solutions also lack dedicated connectivity. Services may not always be on, may not always be enabled, and may not always be monitored. Services may lack consistent logging and security upgrades (e.g., multi-factored authentication). User management may be altogether absent, and may not provide network device management, such that network devices must be managed with respect to every host. If a customer has many different services that require support, then the IT services provider must negotiate access individually, and request that the customer modify the customer's network configuration to accommodate the IT services provider's access to each individual service.

Therefore, flexible and consistent methods and systems for automated IT services management are needed, to reduce costs and risks to IT services providers and customers, and to increase productivity, security and connectivity.

BRIEF SUMMARY

This Brief Summary is provided to introduce a selection of concepts that are further described below in the Detailed Description in a simplified form. This Brief Summary is not intended to identify key features or essential features of the claimed subject matter, nor is it intended to be used to limit the scope of the claimed subject matter.

In one aspect, a computer-implemented method of facilitating access to one or more information technology services includes (i) receiving, from a customer, a selection of one or more information technology services of an information technology services provider; (ii) initializing a machine avatar in a computing environment by analyzing the information technology services; (iii) establishing a network tunnel between the machine avatar and a base management node that runs services of the customer; and (iv) receiving, via the network tunnel, network traffic of the customer addressed to the selected information technology services.

In another aspect, a computing system includes one or more processors; and memory storing instructions that, when executed by the one or more processors, cause the computing system to: (i) receive, from a customer, a selection of one or more information technology services of an information technology services provider; (ii) initialize a machine avatar in a computing environment by analyzing the information technology services; (iii) establish a network tunnel between the machine avatar and a base management node that runs services of the customer; and (iv) receive, via the network tunnel, network traffic of the customer addressed to the selected information technology services.

In yet another aspect, a non-transitory computer readable medium includes program instructions that when executed, cause a computer to: (i) receive, from a customer, a selection of one or more information technology services of an information technology services provider; (ii) initialize a machine avatar in a computing environment by analyzing the information technology services; (iii) establish a network tunnel between the machine avatar and a base management node that runs services of the customer; and (iv) receive, via the network tunnel, network traffic of the customer addressed to the selected information technology services.

BRIEF DESCRIPTION OF THE DRAWINGS

FIG. 6A depicts an exemplary graphical user interface, FIG. 6B depicts exemplary graphical user interfaces for managing network links, FIG. 6C depicts an exemplary configuration of a virtual network interface controller, FIG. 7 depicts an exemplary table of network links.

DETAILED DESCRIPTION

Figure 1:
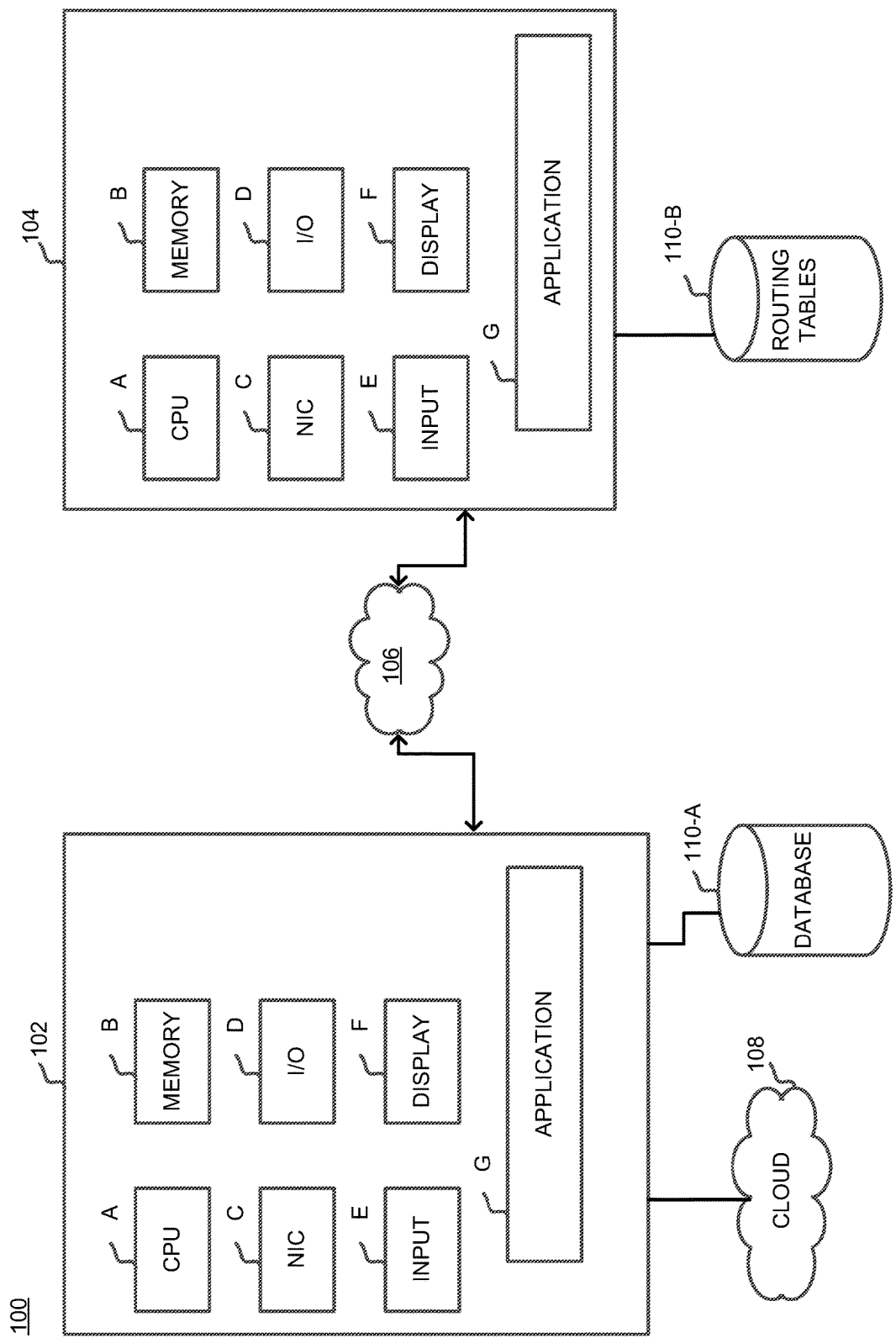
FIG. 1 depicts an exemplary system diagram.

Although the following text sets forth a detailed description of numerous different embodiments, it should be understood that the legal scope of the description is defined by the words of the claims set forth at the end of this text. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term" "is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112(f).

The present techniques include a description of a system and method for automated IT services management, wherein an IT services company/provider may generate an avatar (e.g., a virtual machine and/or physical device/appliance) and distribute the avatar to a customer of the IT services company. The avatar may initiate a persistent network link between a network of the IT services company and a network of the customer. The avatar may permit the IT services company to access the network environment of the customer for the purpose of managing the IT services comprising the network environment, as well as performing routing functions. The IT services provider may be a corporation having separate divisions for a set of one or more facets of IT managed services operations, including without limitation, server management, configuration, field services, managed services, warranty services, etc. The avatar may allow each of the separate divisions of the IT services provider, as well as authorized third parties, to independently and simultaneously administer respective portions of the customer's computing environment. The avatar may include instructions for querying the customer's environment and reporting on the validity of aspects of the customer's environment, which the IT services provider may use to improve and/or certify aspects of the customer's IT infrastructure. The following disclosure includes numerous examples of functionality facilitated by the present techniques.

Example System

FIG. 1 depicts various aspects of an example system 100 for automating IT services management. The high-level architecture of system 100 includes both hardware and software components, as well as various channels for communicating data between the hardware and software components. The system 100 may include hardware and software modules that employ methods of building, deploying and connecting both hardware and software. The modules may be implemented as computer-readable storage memories containing computer readable instructions (i.e., software) for execution by a processor of the system 100.

The system 100 may include a remote computing device 102, which may be communicatively coupled to an avatar 104 and/or to other components of system 100 via a network 106. The remote computing device 102 may include one or more personal computer, smart phone, laptop, tablet, blade server and/or other suitable computing device. The remote computing device 102 may include various hardware components, such as a central processing unit (CPU) 102A, a memory 102B, a network interface controller (NIC) 102C, an input/output (I/O) controller 102D, input device 102E, and/or a display device 102E. The CPU 102A may include any number of processors, including one or more graphics processing unit (GPU). The memory 102B may include a random-access memory (RAM), a read-only memory (ROM), a hard disk drive (HDD), a magnetic storage, a flash memory, a solid-state drive (SSD), and/or one or more other suitable types of volatile or non-volatile memory. The NIC 102C may include one or more physical networking devices (e.g., an Ethernet device, a wireless network controller, etc.). The NIC 102C may allow the remote computing device 102 to communicate with other components of the system 100 via a computer network such as the network 106. The I/O controller 102D may receive input and output from one or more input device (e.g., a peripheral device such as a detached keyboard or mouse) and one or more output device (e.g., a computer monitor, speaker, etc.) and an integral device such as a capacitive touch screen of a portable computing device. The I/O controller 102D may manage data communications between the CPU 102A and the memory 102B by, for example, loading data in a storage region of the memory 102B into a transient memory region of the memory 102B such as an application 102-G.

In an embodiment, the application 102-G may include executable program instructions (i.e., software) that, when executed by the CPU 102-A, causes one or more virtual machine instance stored in the memory 102-B to be loaded and/or modified. The one or more virtual machine instance may be stored in and/or retrieved from a database 110-A. In some embodiments, the application 102-G may also generate one or more virtual machine instances. The virtual machine instances may be containerized, in some embodiments using operating system-level virtualization using suitable containerizing techniques (e.g., Docker, Kubernetes, etc.).

The database 110-A may be directly coupled to the remote computing device 102 and/or accessible via the network 106. The database 110-A may be any suitable database (e.g., a structured query language (SQL) database, flat file database, NoSQL database, key-value store, filesystem-backed data store, etc.). In some embodiments the database 110-A may be storage area network (SAN) or a network attached storage (NAS) or a direct-attached storage (DAS). In an embodiment, the application 102-G may create, modify, or delete aspects of the database 110-A (e.g., by creating a new SAN on behalf of a customer). Portions of the one or more virtual machines may be stored in and retrieved from the database 110-A.

The system 100 may include multiple, differing parallel instances. For example, a first customer may be designated a first instance of the system 100. A second customer may be designated a second system instance of the system 100. The first system instance and the second system instance may be instantiated as respective VM instances, having segregated networks. The first system VM and second system VM may be isolated such that they are mutually inaccessible. The first system and the second system may, respectively, generate a set of one or more virtual machine instances. In an embodiment, a single customer may be associated with multiple instances of the system 100. For example, an A instance of the system 100 and a B instance of the system 100 may be created. The A instance and the B instance may be associated with a customer C, such that the customer uses the two instances for different business and/or practical purposes (e.g., to comply with data security requirements). In some cases, the A instance and B instance may be reciprocally accessible via a computer network, or unilaterally accessible (i.e., from A→B or B→A). Instance A and instance B may be respectively owned/controlled by one or more entities. In some embodiments, the system 100 may be instantiated wholly or partially in, and/or communicatively coupled to, one or more computing cloud 108 (e.g., a private cloud owned by the IT services provider and/or a third party public cloud). More than two instances may be used to implement embodiments of the system 100, as discussed below. Specifically, a connection funnel may maintain separation between networks of unrelated customers within the system 100 or within multiple instances of the system 100 belong to respective unrelated customers.

The remote computing device 102 may include a collection of servers and/or VMs instantiated in public and/or private cloud computing environments and/or data centers. The remote computing device 102 may include hardware and/or software owned by a customer of the IT services provider. However, in general, the remote computing device 102 may be administered and controlled by the IT services provider. The IT services provider's administration of the remote computing device 102 and the system 100 may include the deployment of the avatar 104, as either a physical server or a VM instance. For example, IT services provider may administer the remote computing device 102 of the system 100 to add/remove computational resources (e.g., processors, memory, storage, etc.), add/remove applications, to add/remove connectivity (e.g., firewall rules), etc. Upstream services (i.e., services that are accessible to the remote computing device 102) may be made accessible to the network 106 via the creation of one or more tunnels in the remote computing device 102.

As noted, in some embodiments, the remote computing device 102 may connect to other components via a computer network such as the network 106. The network 106 may be a wireless network of a consumer network provider (e.g., a Global System for Mobile communication (GSM) provider or Code Division Multiple Access (CDMA) provider). In some embodiments the network 106 may be a private wireless network. In some embodiments, the network 106 may include an Internet Service Provider (ISP) such as a Tier 1 and/or Tier 2 network. In some embodiments, the network 106 may include the Internet and/or another suitable network (e.g., a local area network (LAN), a metropolitan area network (MAN), a wide area network (WAN), a mobile, a wired or wireless network, a virtual private network (VPN), etc.). The system 100 may include one or more application programming interface (API) service provided by a third party and/or the IT services provider (not depicted).

The avatar 104 may be leased or loaned to the customer backend component of the system 100, as a hardware appliance for the customer's use during the provision of services by the IT services provider, or as a virtual image that the customer could implement in the customer's own virtualization environment for use during the provision of services by the IT services provider. The avatar 104 may include various hardware components, such as a CPU 104-A, a memory 104-B, a NIC 104-C, an I/O controller 104-D, an input device 104-E, a display device 104-F, and an application 102-G. The CPU 104-A may include any number of processors, possibly including one or more GPUs. The memory 104-B may include a RAM, a ROM, a HDD, a magnetic storage, a flash memory, an SSD, and/or one or more other suitable types of volatile or non-volatile memory. The NIC 104-C may include one or more physical networking devices (e.g., an Ethernet device, a wireless network controller, etc.). The NIC 104-C may allow the avatar 104 to communicate with other components of the system 100 via a computer network such as the network 106. The input device 104-E may include one or more peripheral device such as a detached keyboard or mouse, or an integral device such as a capacitive touch screen of a portable computing device. The output device 104-F may be a suitable display device such as a computer monitor, capacitive touch screen, television screen, etc. In some embodiments, the avatar 104 may be a VM. In other embodiments, the avatar 104 may be a VM downloaded by the customer from the IT service provider. The avatar VM may be a large (e.g., gigabytes or larger) image file.

In some embodiments, the avatar 104 may be installed at the premises of the customer or a facility related to a customer (e.g., a corporate office, datacenter, etc.). In those embodiments, a customer employee/contractor may interact with the avatar 104 via the input device 104-E, the display device 104-F, and/or via a computer terminal communicatively coupled to the avatar 104.

The avatar 104 may include one or more modules implemented as hardware (e.g., a hardware appliance) and/or computer readable instructions (e.g., software). For example, the avatar 104 may include the application 104-G. The application 104-G may include instructions that execute upon the occurrence of an event. For example, the avatar 104 may include a set of instructions for establishing one or more tunnel via network 106 at boot time, and/or in the event of a network change (e.g., if a new dynamic IP address is assigned by a dynamic host configuration protocol (DHCP) server). The avatar 104 may be communicatively coupled to an electronic database 110-B. The electronic database 110-B may store data relating to the customer's business operations.

In operation, a customer may have a contract with the IT services provider, or may be considering hiring the IT services provider to provide services. That is, the customer may be an established customer or a new customer contracting with the IT services provider on a trial basis. The customer may contact the IT services provider by visiting a website hosted in the remote computing device 102 or another computer of the IT services provider. The website may serve a web page to the customer including a menu of available services. The menu may differ, depending on the status of the customer (e.g., new customer or existing customer). It should be appreciated that in some embodiments, the customer may add more services or order new services via another electronic medium (e.g., a telephone call to the IT services provider). The customer may then select from the menu of available services, and submit a list of desired services.

The application 102-G may analyze the list of services desired by the customer and, based on the desired services of the customer, generate either a customized VM appliance and/or generate an order for the creation of a physical appliance (i.e., an avatar). The application 102-G may include instructions for immediately delivering the generated customized VM appliance to the customer via a download link, via email, and/or via an automated installation in the computing cloud 108. The computing cloud 108 may include a resource (e.g., an existing VM) owned/controlled by the customer. In some embodiments, the customer may be required to grant access to the IT services provider before the customized VM appliance may be installed. Part of the grant of access may include granting access to firewall rules of the customer. In that case, the IT services provider may automatically configure the customized VM appliance to run in the chosen cloud, optionally based on the type of cloud, instantiate the customized VM appliance, and automatically configure the firewall rules associated with the VM appliance. In some embodiments, instructions for installing and/or configuring the customer's VM and associated firewall rules manually may be displayed/communicated to the customer, such as when the customer indicates that they will perform the VM installation/configuration on their own.

The instructions for installing/configuring the customer's firewall rules manually may instruct the customer to, inter alia, download the customized VM appliance, launch the VM appliance in an appropriate hypervisor/VM emulator, provide the VM appliance with certain permissions in the virtualization environment (e.g., to network layers and/or devices), and/or perform certain networking tasks (e.g., create virtual/physical networking device nodes, modify permissions, open ports, filter network packets (e.g., IPv4 packets, IPv6 packets, etc.) by type, etc.). However, in general, the instructions may be limited to asking the customer to boot the VM and to open ports in the customer's external firewall. Specifically, the VM may be instantiated behind a general corporate or router-based firewall of the customer, and ports exterior to that corporate firewall may need to be opened to allow the IT services provider to reach the avatar 104 (i.e., the instantiated VM appliance/physical appliance). In some embodiments, the avatar 104 may be installed in a de-militarized zone (DMZ) of a network, which may obviate the need to open ports. In other cases, more complex procedures may be advised, such as establishing port-knocking software. Access-based controls such as VPN passthroughs via IPSec may be used.

When the customer boots the avatar for the first time, whether virtual or physical, the avatar may execute an initialization procedure including a set of executable program instructions. In an embodiment, the IT services provider may instantiate two or more multiple remote computing device 102. The two or more remote computing device 102 may perform different functions. For example, a first remote computing device 102 may perform a port forwarding function. A second remote computing device 102 may perform an intermediary host function. A third remote computing device 102 may perform a connection funnel function. A fourth remote computing device 102 may perform a firewalling function, and so on. Each of the two or more remote computing device 102 may include more or less hardware and/or software, and different sets of installed hardware and/or software as appropriate. For example, the port forwarder remote computing device 102 may include multiple physical interface devices to perform forward and reverse proxying operations using multiple physical and/or virtual (e.g., TUN/TAP) virtual network interface. The IT services provider may associate the remote computing device 102 with a particular customer. In that case, the remote computing device 102 may be known as a Base Management Node (BMN). The BMN may run services of the customer (e.g., a Remote Authentication Dial-In User Service (RADIUS)). In some embodiments, each customer of the IT services provider may be provided with a BMN wherein each BMN has an address that corresponds to the customer's environment. When a BMN is used, the avatar 104 provided by the IT services provider to the customer may be a thin client. If the thin client is stolen or misplaced, then sensitive material on the avatar may be minimized. Full disk encryption may, therefore, not be necessary and the avatar 104 may be invalidated and blocked from connecting to the BMN. From a risk perspective, keeping information segmented by the use of the avatar 104 is very beneficial and results in a much smaller hardware footprint and software footprint in the customer's network customer side. The avatar 104 may be a relatively low-powered device (e.g., an Internet-of-Things (IoT) device).

Once the avatar 104 is delivered to the customer, whether the avatar 104 is a physical device or a virtual machine, the avatar 104 may run an initialization procedure. The initialization procedure may take place only one time, when the avatar 104 is first connected to the network 106, for example. The initialization protocol may include the avatar 104 connecting to one of a plurality of purpose-built computing environments that are accessible via the network 106. The initialization protocol may include establishing a set of one or more tunnels between the avatar 104 and a set of one or more a BMNs. The initialization protocol is discussed further below.

Example Data Flow Diagram

Figure 2:
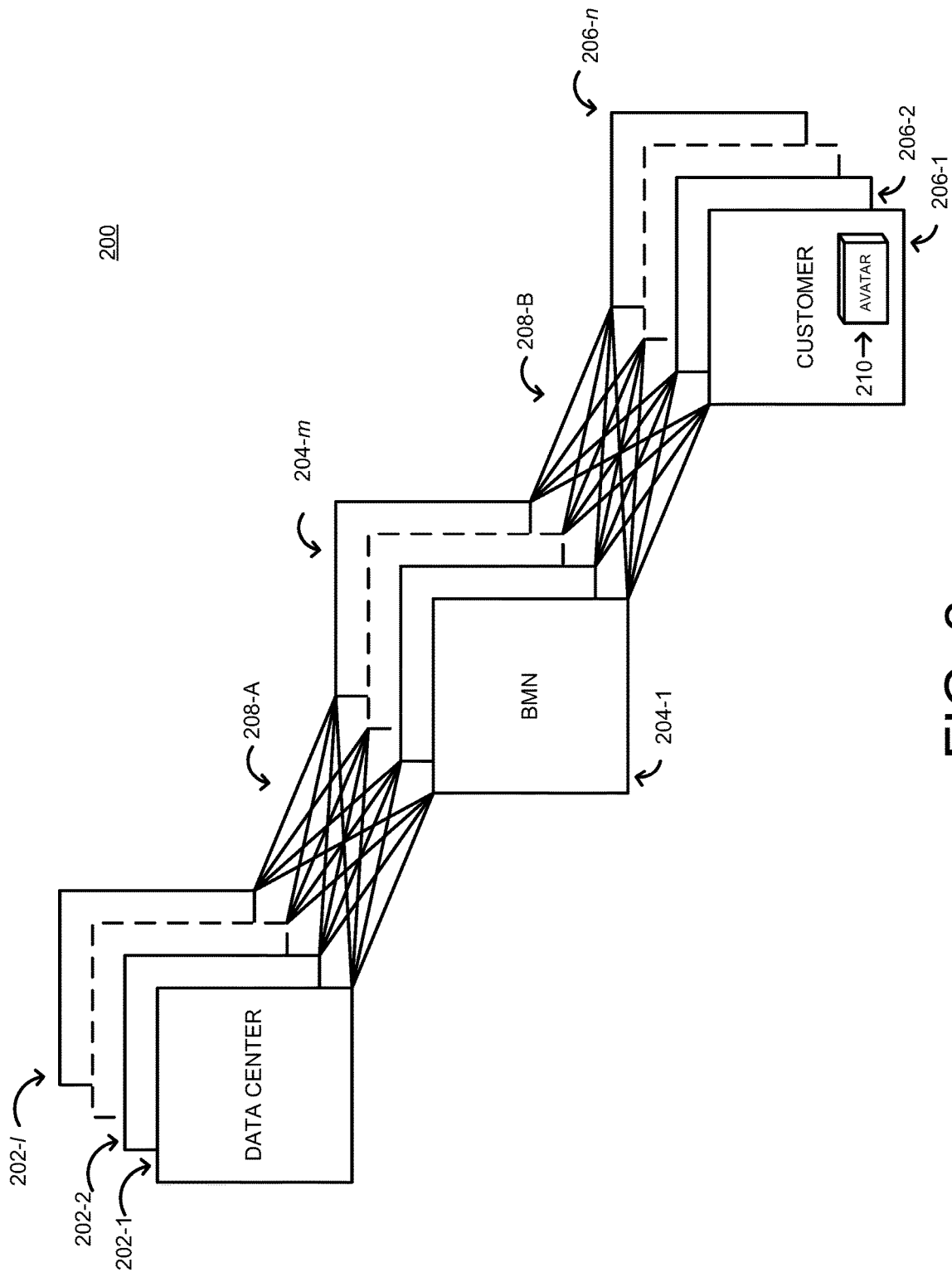
FIG. 2 depicts an exemplary data flow diagram.

FIG. 2 is a data flow diagram 200 illustrating the operation of methods and systems for operation of automated IT services management. Some embodiments may include one or more data center. The data centers may include data center 202-1, 202-2, through 202-l, each of which may be located in the United States or elsewhere. The data flow diagram 20 may include BMNs 204-1, 204-2 through 204-m. The data flow diagram 200 may include customer infrastructure 206-1, 206-2 through 206-n. The numbers l, m, and n may be any positive integers. That is, data flow diagram 200 may include any number of data centers, BMNs, and/or customer infrastructure. The data flow diagram 200 depicts each data center as being communicatively coupled to each BMN via communication links 208-A, and each BMN as being communicatively coupled to each customer infrastructure via communication links 208-B. However, in some embodiments fewer links may exist. For example, links 208-A may include one communicative link between the data center 202-1 and the BMN 204-1. In some embodiments, each BMN may be linked to one corresponding customer infrastructure. Customer infrastructure 206-1 through 206-n may each include a respective set of one or more avatar 210, each of which may correspond to the avatar 102, for example.

As discussed above, the avatar 210 may connect to one of a plurality of purpose-built computing environments during the initialization procedure. The avatar 210 may first connect to a connection broker, identifying the avatar 210 by providing a unique identifier (e.g., a universally-unique identifier (UUID)) to the connection broker as a parameter. The connection broker may compare the UUID to a list of avatars in a database, such as database 110-A, to identify a data center corresponding to the avatar 210. Based on the UUID, the connection broker may determine which BMN to build a connection to. Connecting to the connection broker may include identifying a monitoring environment for the customer. For example, a small customer may have a subscription with the IT services company to a service (e.g., a monitoring service) in a first data center (e.g., a data center located in Chicago). The tunnel may then be established to the first data center (e.g., the data center 202-1). Building the connection may include creating multiple TUN devices in the avatar 210. The connection broker may transmit a set of initialization data to the avatar 210, the initialization data including an IP address for the avatar. The avatar 210 may build a point-to-point (P2P) link, using the IP address, wherein packets flow seamlessly between the BMN 204-1 and devices in the customer infrastructure 206-1 via the avatar 210, over the P2P link. A P2P link may differ from an Ethernet link insofar as that the P2P link may be a network level (i.e., layer-3) link, whereas the Ethernet link may be a level-2 link. Various protocols (e.g., NTP, HTTP, RDP, etc.) may be simultaneously routed between the customer environment 206-1 and the BMN 204-1. The initialization protocol may be run at given times (e.g., when a connection of the avatar 210 is disconnected, when the device or virtual machine implementing the avatar 210 reboots, on a schedule, etc.). The avatar 210 may also include a second initialization routine. For example, if the selected data center is unavailable, such as in the event of catastrophic failure, disaster recovery test, etc., then the avatar 210 may include a set of instructions for automatically routing to a fallback data center.

The avatar 210 may require two or more IP addresses in the customer infrastructure 206-1. For example, a first IP address may be used by the avatar 210 for connectivity inbound to the customer infrastructure 206-1, and a second IP address may be used for outbound connectivity to the BMN 204-1. The BMN may masquerade for services behind it, that is, services that are only accessible to users of the customer infrastructure 206-1 via the BMN. The customer may have limited visibility of the services behind the BMN. The linkages between the customer infrastructure 206-1 and the BMN 204-1 may be such that a user of customer infrastructure 206-1 through 206-n inspecting the network environment of customer infrastructure 206-1 (e.g., via ping) would not see any evidence of the IP address of the avatar 210 installed in the customer infrastructure 206-1. Rather, the customer would see an IP address belonging to the BMN. Additionally, the avatar 210 may enable computers in the customer's network to access the BMN without configuring firewalls, routers, etc. The customer may need only open two or more ports in the customer infrastructure 204-1 firewall or another firewall. The avatar 210 may be located in any location that is communicatively coupled to the customer infrastructure can be located anywhere, and need not be located in the customer's physical or virtual network. In some embodiments, the avatar 210 can be located in a geographic region other than where the customer infrastructure 206-1 is located (e.g., in another country).

In general, the collection of avatar 210 machines and their respective links allow the IT services company to effectively manage customer environments at scale on a customer-by-customer basis, to meet the need of each customer. For example, some customers may be provided with redundant environments, data centers, avatars, and/or BMNs. A customer representing monthly revenue of $50 may not be provisioned redundantly. However, a $25,000/month customer may be provisioned using fully replicated/redundant resources. The IT services provider may operate a cloud system that enables on-demand horizontal scaling without practical resource limitations.

The present techniques are much more cost effective than hardware-based systems of the past. As noted above, under old models, the IT services company had to send hardware to the customer at the outset of a business relationship, and periodically throughout the business relationship. Using the techniques described herein, the IT services company can provide just-in-time backend services, and can project services to the customer on demand by, for example, modifying a BMN associated with the customer. The scaling aspect is also very useful for prototyping and marketing purposes. Normally, an IT services company that wanted to provide 5,000 samples of IT services would need to send 5,000 managed hardware devices to individual customers. However, using the present techniques, the IT services company can send 5,000 invitations, and only activate as many avatar device resources (virtualized or hardware) as interested customers respond to the invitations.

The avatar 210 may be deployed into an existing cloud computing platform (e.g., via Amazon Web Services) by virtual deployment. The IT services provider may then connect to the customer infrastructure associated with the avatar 210 via the existing cloud to manage resources in the customer infrastructure that are not in the existing cloud as well as resources that are accessible via the existing cloud. Each customer may have their own virtual infrastructure from a networking and data traffic perspective. This isolation satisfies numerous compliance and security requirements.

The methods and systems described herein are applicable to any managed services environment including, without limitation, those of insurance, healthcare, manufacturing, e-commerce, and financial services companies. Federal, state, and municipal government IT resources may be managed using the present techniques. In some embodiments, concerns and/or suggestions regarding the present techniques may result in infrastructure upgrades that may be propagated between customers. The present techniques allow the IT services provider to expand the IT services provider's existing toolset into the customer's environment. For example, a service VM may be transferred via the avatar 210 to the customer infrastructure 206-1. The service VM may be accessible only by the IT services provider, and may include instructions for analyzing and modifying aspects of the customer infrastructure 206-1. Tools, firewall rules, and other resources that customers might typically need for IT services may be eliminated. Further, because the IT services provider has greater direct control over the service environment (e.g., the remote computing device 102), the IT services provider can tune those critical aspects of the service environment (e.g., geographic redundancy, high-availability, etc.) on an as-needed basis.

Example Automated IT Services Management System

Figure 3:
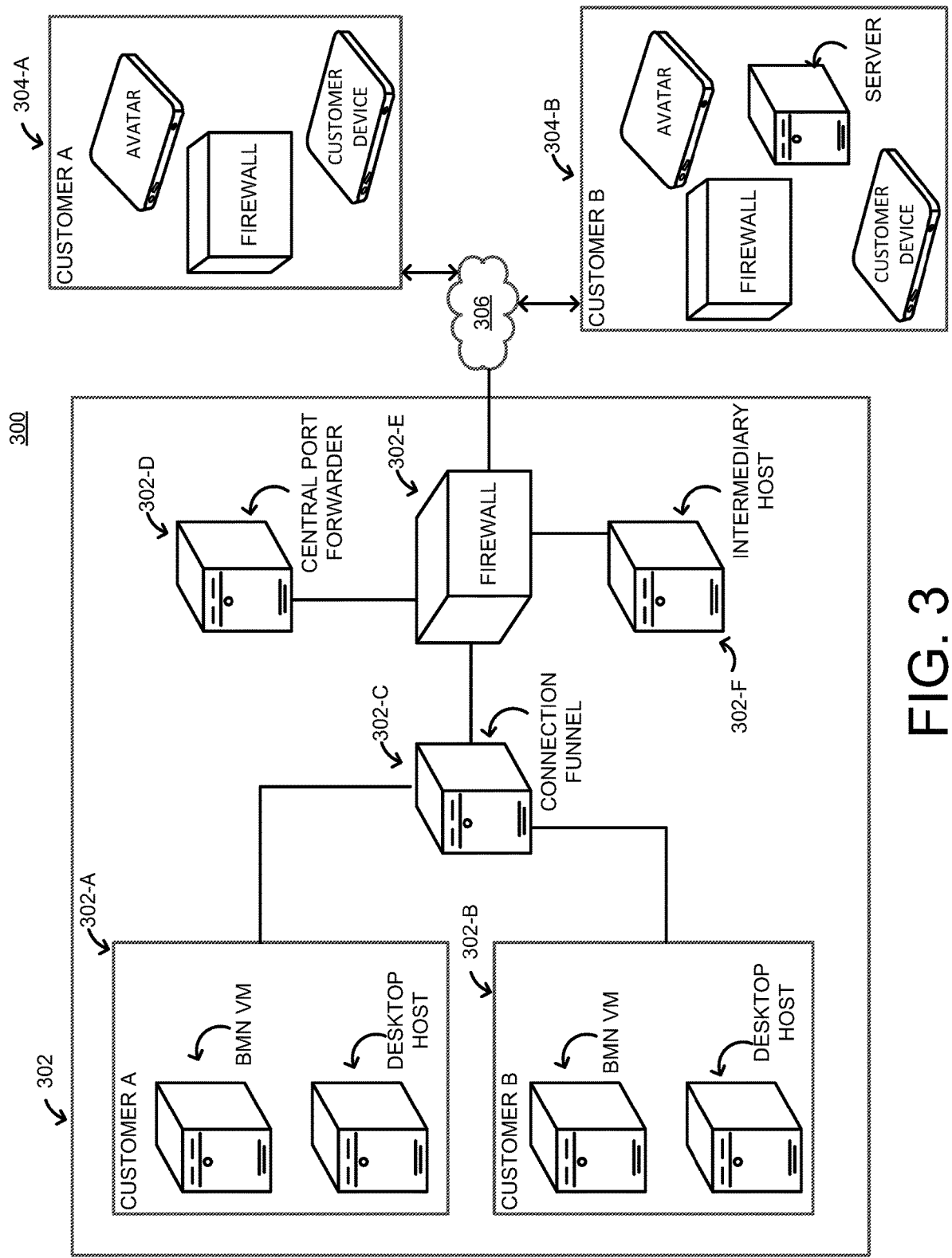
FIG. 3 depicts an exemplary data flow diagram.

FIG. 3 depicts a system diagram 300 including an IT service provider infrastructure 302 including respective customer hosting regions and customer infrastructure, and a network 306. The IT service provider infrastructure 302 may include a customer service region 302-A, a customer service region 302-B, a connection funnel 302-C, a central port forwarder 302-D, a firewall 302-E, and an intermediary host 302-F. Although only two customer service regions are depicted, any practical number of customers and service regions may be supported in IT service provider infrastructure 302. System diagram 300 may also include a customer infrastructure 304-A and a customer infrastructure 304-B, which may correspond, respectively, to the customer service region 302-A and the customer service region 302-B. The customer infrastructure 304-A and the customer infrastructure 304-B may represent data centers of the respective customers. The IT service provider infrastructure 302 may be communicatively coupled to the customer infrastructure 304-A and the customer infrastructure 304-B via the network 306. The network 306 may correspond to the network 106 depicted in FIG. 1.

As noted above, the avatar in customer infrastructure 304-A may execute initialization instructions based upon the occurrence of an event (e.g., at boot time, if connectivity is lost, upon receiving/retrieving a signal, etc.). In some embodiments, the avatar may correspond to the avatar 104 and/or the avatar 210. The initialization instructions may include connecting the avatar to one or more connection broker (not depicted). The connection broker may be thought of as a traffic director. The avatar may identify itself by providing an identification parameter to the connection broker, and the connection broker may determine the owner/controller customer associated with the avatar by associating the identification parameter in a database comprising customer information, such as the database 110-A. The connection broker may determine one or more priority data centers (e.g., Chicago and Milwaukee). The data center(s), which may correspond to the data center 202-1 through the data center 202-*l* of FIG. 2, may be based on geographic proximity to the avatar, in some embodiments. Because multiple priority data centers are identified, if one of the data centers is unreachable, one of the other data centers may act to handle the customer's connectivity.

The avatar may then connect to the intermediary host 302-F. By default, the avatar may be unreachable from the Internet. When the avatar connects to the intermediary host 302-F (e.g., via secure shell (SSH)), the avatar may create a persistent connection to the intermediary host 302-F. The intermediary host 302-F may reside in the provider infrastructure 302, and may be accessible only from within the provider infrastructure 302. Therefore, in an embodiment, a host (e.g., a networked computer) in the provider infrastructure 302 may be able to connect to the avatar via the intermediary host 302-F and the customer firewall within the customer infrastructure 304-A, without creating a connection that is visible to hosts on the open Internet (e.g., hosts accessible via the network 306). Here, the intermediary host 302-F may have a level of trust that is higher than other hosts, and various forms of authentication may be used to enforce access to the customer infrastructure 304-A (e.g., public and/or private key authentication, multi-factor authentication, etc.).

In an embodiment, the connection between the avatar and the intermediary host 302-F may comprise two network tunnels. The two tunnels may allow traffic to flow to and from the avatar via the intermediary host 302-F. Further, one or more additional persistent tunnels may be created between components of the customer service region 302-A and the avatar via the intermediary host 302-F. establishing one or more tunnel linked to the one or more respective remote computing device 102.

From the perspective of a customer within the customer infrastructure 304-A, the BMN of customer service region 302-A may appear to be directly connected to the customer infrastructure 304-A, even though several network hops are required to reach the BMN. The BMN may be located in a data center. Furthermore, the BMN may be associated with one or more services that the BMN is responsible for forwarding to the customer in the forward and reverse direction. For example, one or more monitoring collector may be associated with the BMN. Each of the one or more monitoring collector may collect data from the customer infrastructure 304-A via the connection(s) linking the avatar to the BMN discussed above. The BMN may transparently proxy/masquerade the connections to and from the avatar via the BMN, such that if the customer were to inspect the packets, the customer would not be able to tell that a particular one of the one or more monitoring collector was initiating and/or receiving the traffic. Additionally, the customer may not able to determine the ultimate destination of any packets sent to the BMN.

In some embodiments, 302 is a single pod. Each one may have a central port forwarder 302-D, connection funnel 302-C, etc. In this way, a customer may have their own set of services and tunnel stack, keeping the customer environments segregated and not inter-accessible. In some embodiments, the separation may be enforced in user space via a software-defined network. The firewall 302-E may restrict the packets that may be passed between the intermediary host 302-F and the connection broker.

In some embodiments, the connection funnel 302-C may include IP blacklists on a per-BMN and/or per-customer basis. For example, the connection funnel 302-C may include a list C of customers $C_1$-$C_n$ in association with an address space for each customer C, wherein n is a positive integer. The connection funnel 302-C may be a software-driven firewall including rules for filtering packets according to whether a given BMN may transmit packets to a given address space of a particular customer in C. For example, the BMN depicted in customer service 302-B may have a first Ethernet card (e.g., eth0). Connection funnel 302-C may include firewall instructions such that packets from the first Ethernet card having an IP address matching the BMN may only be sent to hosts in the IP range 8.9.10.0-8.9.10.255. That is, only 256 hosts could possibly receive packets from that BMN, and no others. In some embodiments, the firewall instructions may similarly restrict other BMNs (e.g., the BMN in customer service region 302-A) from sending packets to those IP ranges. In some embodiments, the IP range may be specified as a set of Classless Inter-Domain Routing (CIDR) network specification. For example, to continue the example, the above IP range could be specified as 8.9.10.0/24. Network traffic may also be restricted to only that traffic sent via the intermediary host 302-F on a given port.

The customer funnel 302-C includes rules preventing customer service region 302-A from contacting customer service region 302-A. The connection funnel 302-C is automatically updated any time a new customer service region is added and/or deleted. When an appliance comes online, the customer service region is created, and the appropriate firewall rules are automatically added to the connection funnel 302-C.

Example Operation of Automated Information Technology Services Managmement

Figure 4A:
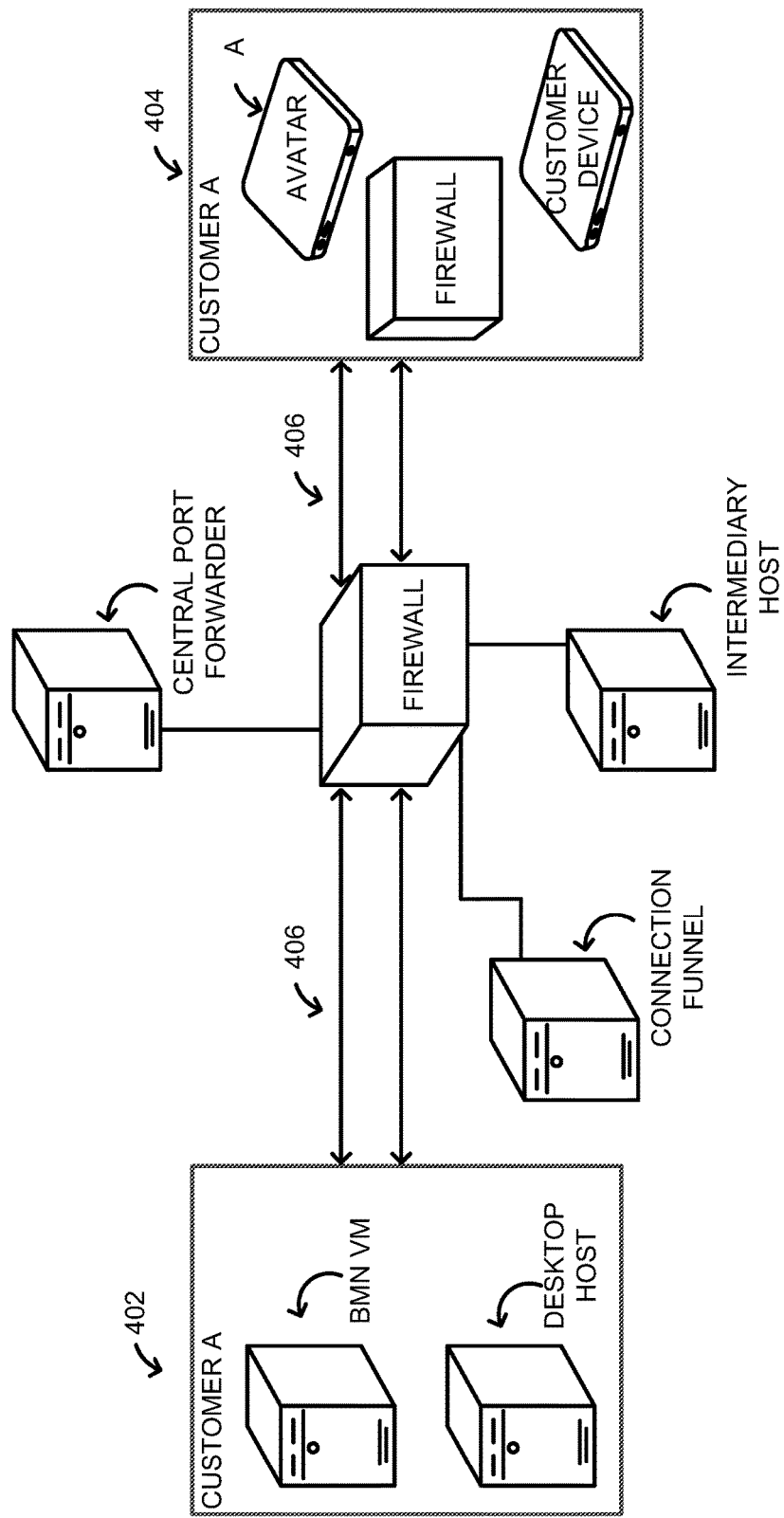
FIG. 4A depicts an exemplary data flow diagram of an operation environment, according to an embodiment.

FIG. 4A depicts an example operation environment 400 including a customer service region 402, a customer infrastructure 404, and a network link 406. The customer service region 402 may correspond to the customer service region 302-A of FIG. 3. The customer service region 402 may reside in a data center of the IT services provider, such as data center 202-1 of FIG. 2. The customer infrastructure 404 may correspond to the customer infrastructure 304-A, or another customer infrastructure, of FIG. 3. Operation environment 400 may include a connection funnel, central port forwarder, firewall, and intermediary host; which may respectively correspond to the connection funnel 302-C, the central port forwarder 302-D, firewall 302-E, and intermediary host 302-F of FIG. 3. A connection broker may also be included in the environment 400. The connection broker may correspond to the remote computing device 102 of FIG. 1.

In operation environment 400, the customer service region 402 may correspond to the customer service region 302-A of FIG. 3, for example. The customer service region 402 may include a BMN virtual machine and a desktop host. The customer infrastructure 404 may include an appliance and one or more customer device, behind a firewall associated with the customer infrastructure 404. The network link 406 may correspond to the network 106 of FIG. 1 and the network 306 of FIG. 3.

Figure 4B:
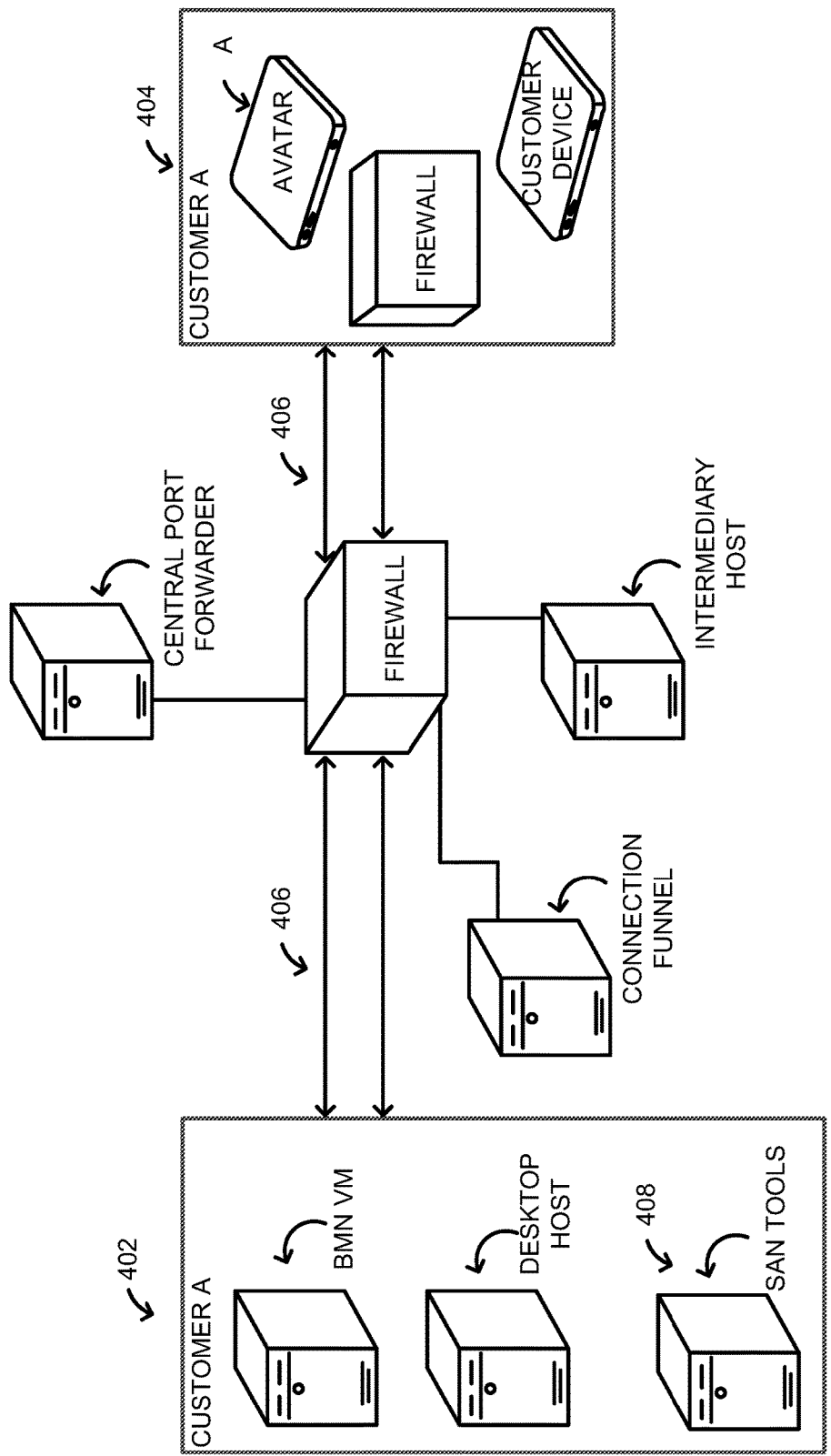
FIG. 4B depicts an exemplary data flow diagram of an operation environment, according to an embodiment.

FIG. 4B depicts an example operation environment 400 including a storage area network (SAN) 408 according to an embodiment. In this embodiment, the SAN 408 may be used by a storage administration team of the IT services provider. The SAN 408 may reside in a data center of the IT services provider. The SAN 408 may be scaled according to the input/output operations (IOPs) and/or network throughput of the network 406. The SAN may store a VM within the data center. Herein, the resources provided via the IT services provider may be any suitable IT resources, including without limitation labor of employees/contractors, access to information (e.g., a database), an API of the IT services provider or a third party, etc.

Figure 4C:
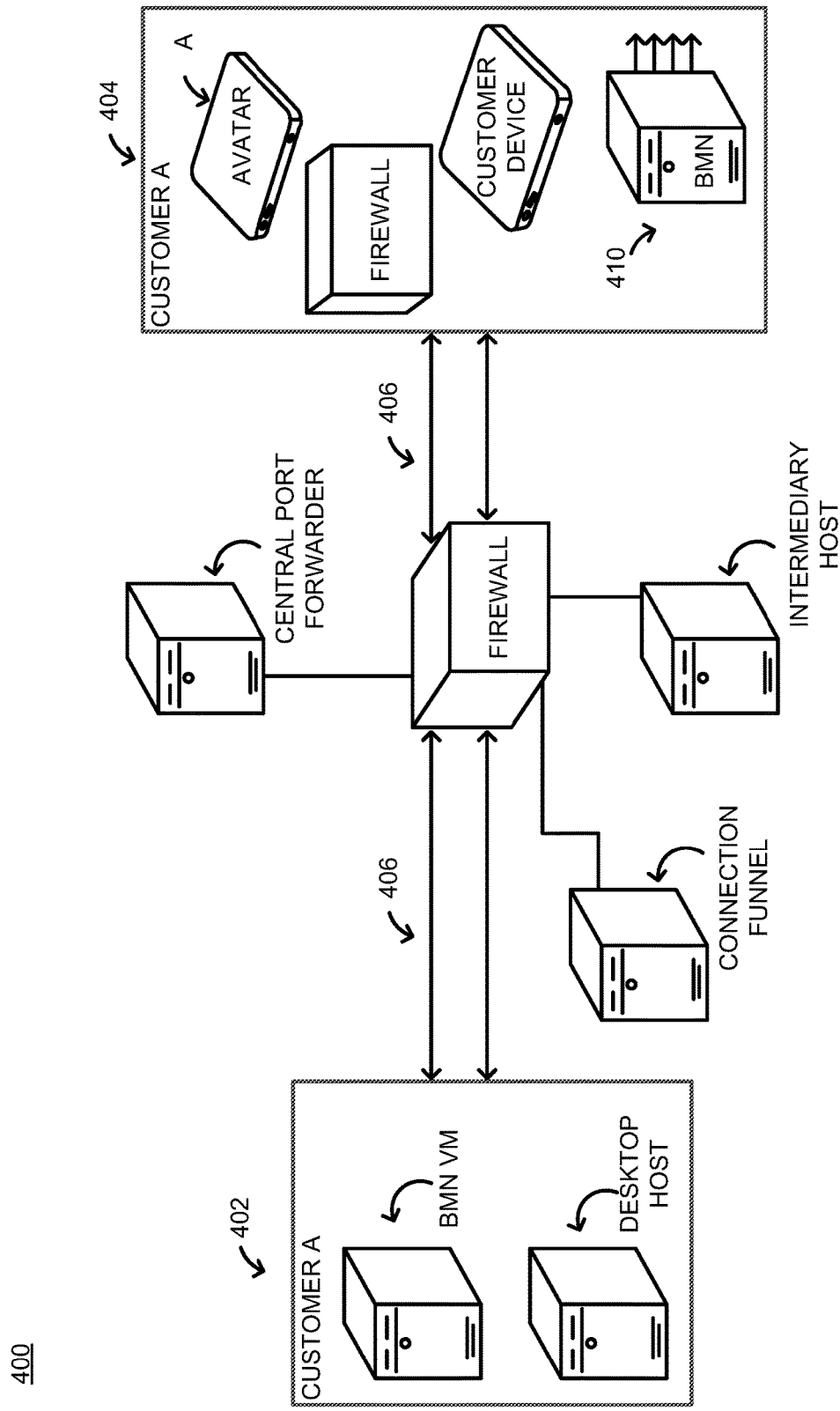
FIG. 4C depicts an exemplary data flow diagram of an operation environment, according to an embodiment.

FIG. 4C depicts an example operation environment 400 including a hardware BMN 410 collocated in the customer infrastructure 404, according to an embodiment. In FIG. 4C, the customer infrastructure 404 may have high storage and/or data processing requirements. The customer infrastructure 404 may have very low allowable latency. For example, the customer infrastructure 404 may include a firewall that generates large amounts of data very quickly, or an application that processes equity trades in near real-time. The hardware BMN 410 collocated in the customer infrastructure 404 may function identically to the BMNs residing in the customer service region 402 in FIG. 4B. In an embodiment, the collocated BMN 410 may be a virtualized computing instance, in some embodiments. Because the BMN 410 is collocated, the customer can still monitor core systems via the BMN 410 given a loss of connectivity to the network link 406.

Figure 4D:
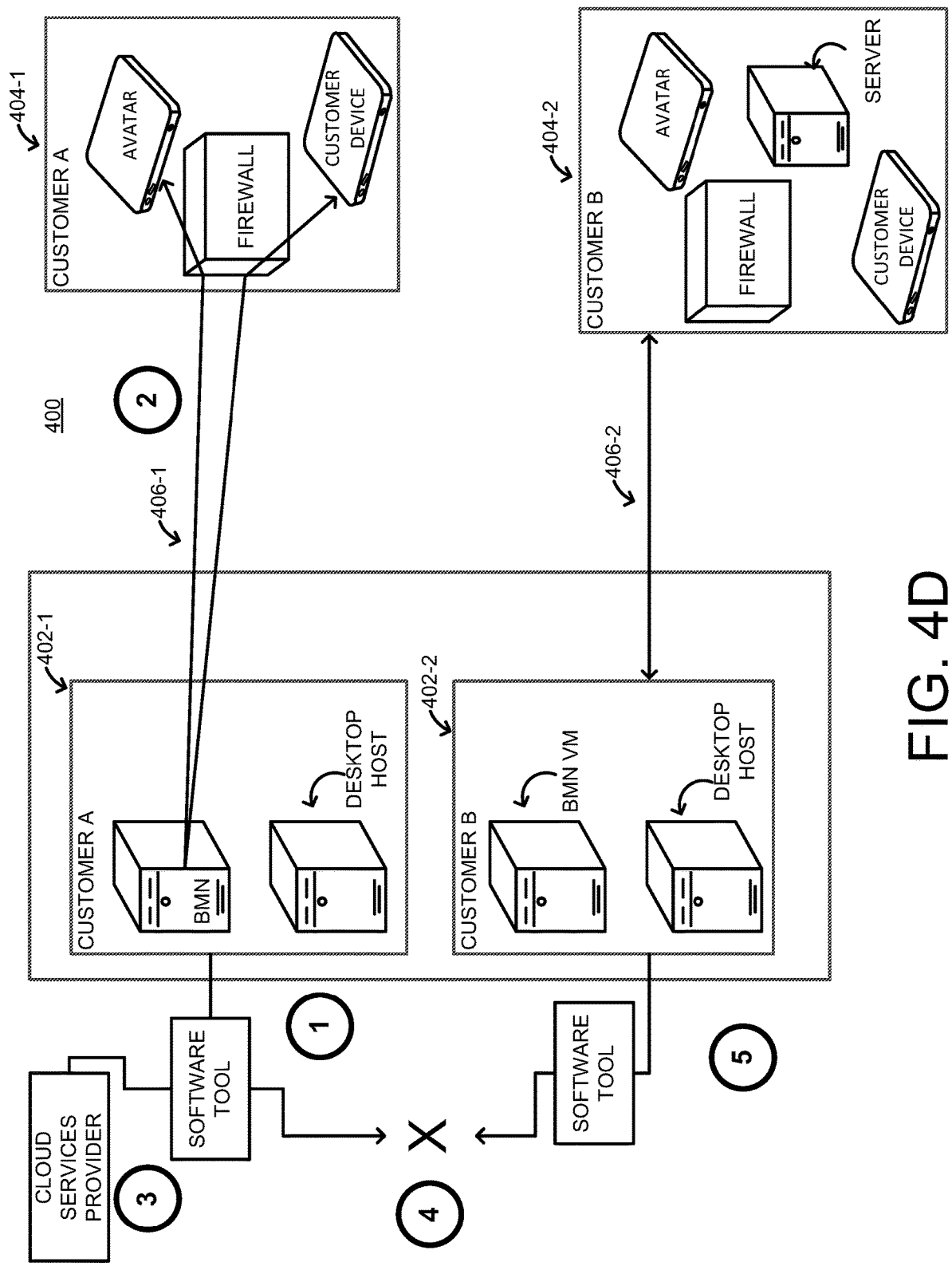
FIG. 4D depicts an example block diagram including an example method for automated delivery of licensed software.

FIG. 4D depicts an example block diagram 400 including an example method for the automated delivery and/or usage of a copy of licensed software to a customer's BMN. In the depicted embodiment, the licensed software may be a scanning utility. The method may include loading the software tool in a virtual machine (VM) template (block 1). The VM template may be based on a GNU/Linux VM, for example. Next, the VM may be initialized (i.e., booted) and populated with data needed to use the licensed software. The method may include using the software on behalf of the customer infrastructure 404-1 (e.g., scanning the customer infrastructure 404-1 via the network link 406-1) to generate an output based on the scanning (block 2). The method may include posting the results of the scanning to a cloud services provider, including an identifier uniquely identifying the customer (block 3). The method may include destroying the initialized VM, to avoid passing a VM between customers that could have been infected or which contains private customer data (block 4). After the completion of a task, the VM hosting the licensed software may be destroyed, reducing potential liability and overall software footprint. The method may include repeating blocks 1-4 of the method on behalf of any number of additional customers (e.g., on behalf of the customer infrastructure 404-2) (block 5). Thus, the present techniques provide a way for one or more licensed software to be shared amongst multiple customers. In some embodiments, free software and other types of software may be provisioned as discussed with respect to FIG. 4D. Further, the provisioning may be scaled to run either on demand or on a schedule. The software may be run for a period of time, in some embodiments, and then may reside in the customer VM until the customer completes a task. In some embodiments, a licensed hardware asset or quasi-hardware asset (e.g., access to a particular virtual machine or device) may be provided in place of, or in addition to, the licensed software asset.

Figure 4E:
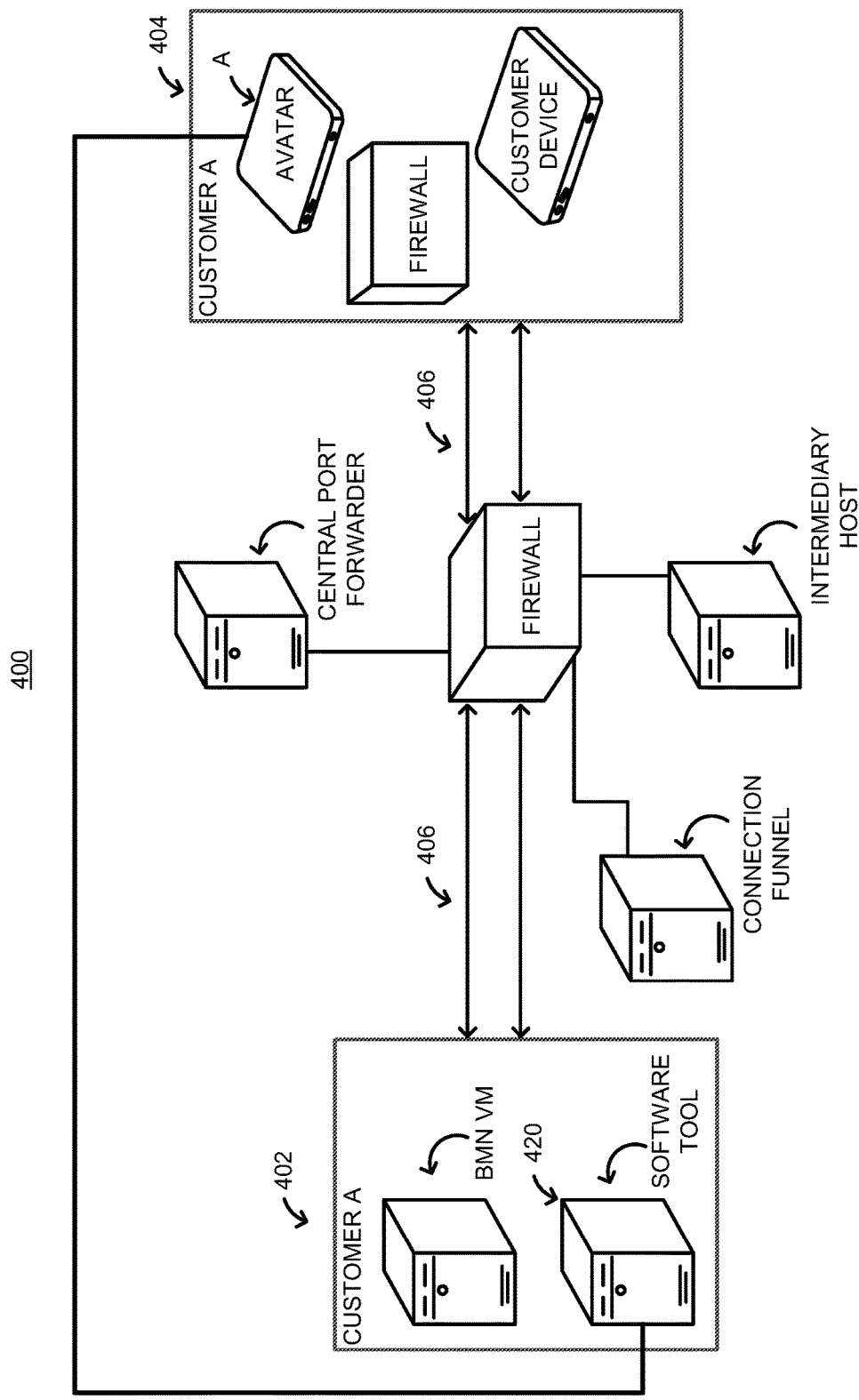
FIG. 4E depicts an exemplary data flow diagram of an operation environment, according to an embodiment.

FIG. 4E depicts an example operation environment 400 including a software tool 420, installed in the customer service region 402, and communicatively coupled to a BMN associated with the customer. The software tool 420 may correspond to the scanning utility depicted in the method of FIG. 4D, above. Here, the IT services provider may replace a software tool running on the BMN with a VM is communicatively coupled to the BMN (i.e., the software tool 420). The BMN may masquerade all traffic from the software tool 420 (e.g., an appliance), so that to other machines, traffic from the software tool 420 by way of the BMN appears as though it originated from an IP address associated with the BMN. Consequently, devices in the customer infrastructure 404 will not be able to tell that the virtualized software tool 420 is different from the non-virtualized scanning utility that was replaced. No customer devices will need to be touched in order to make the switch, highlighting a benefit of the techniques disclosed herein.

Figure 4F:
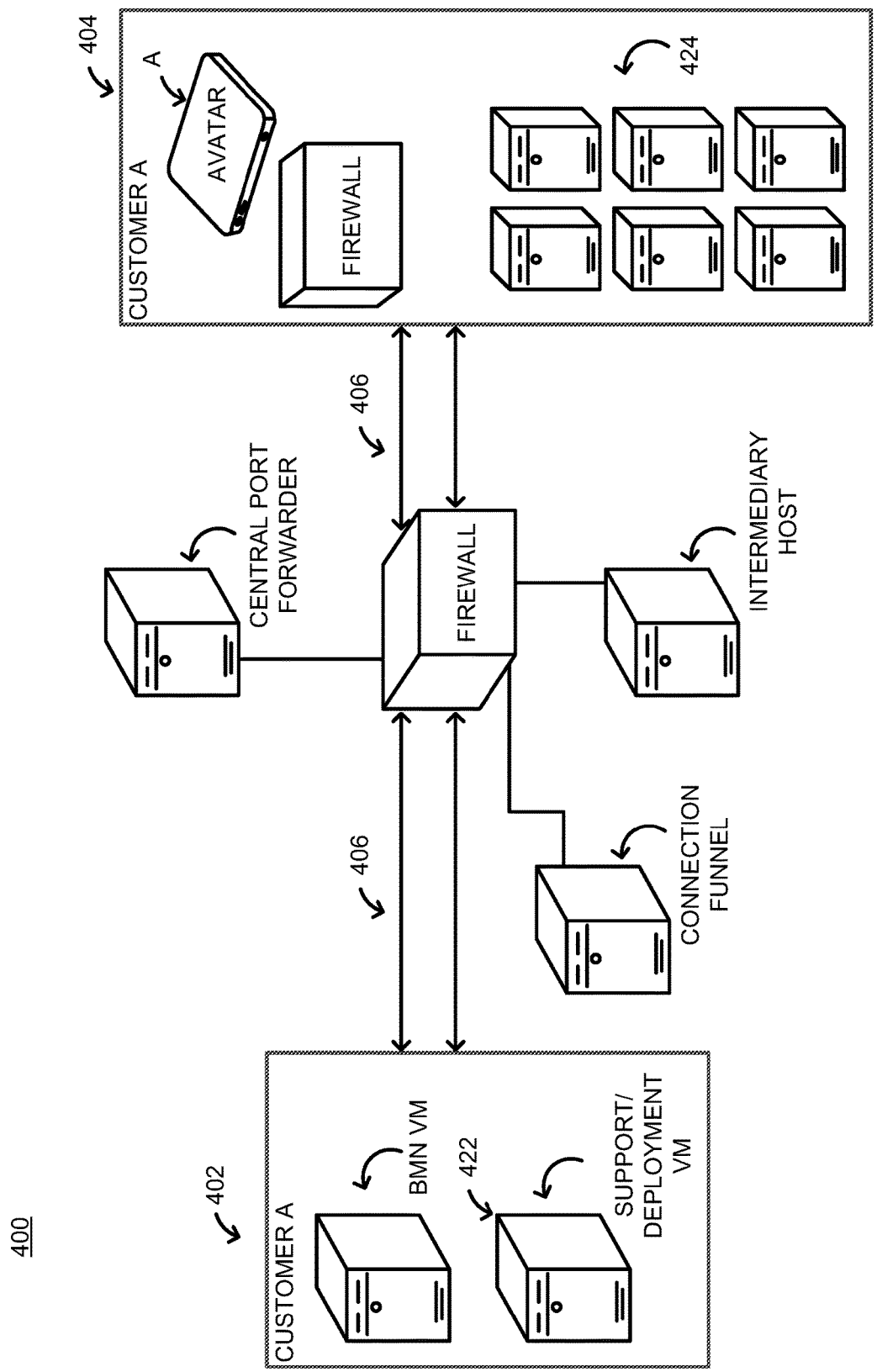
FIG. 4F depicts an exemplary data flow diagram of an operation environment, according to an embodiment.

FIG. 4F depicts an example operation environment 400 including a software tool 422, installed in the customer service region 402, and communicatively coupled to a BMN associated with the customer. The deployment VM 422 may be used during the installation of a multi-server deployment 424. Specifically, a customer may order a product requiring a complex deployment which may take several weeks to complete. In the meantime, the avatar 404-A may be downloaded or shipped to the customer, and installed as discussed above. The IT services provider may then configure and build the deployment VM 422 based on a template maintained by the IT services provider (e.g., by the engineers performing the multi-server deployment 424). The engineers may push data (e.g., installation files) to the customer infrastructure 404 via the avatar 404-A, so that when the engineers arrive onsite at the customer, they are in a position to work immediately. In some embodiments, the engineers may be able to complete the multi-server deployment 424 once the servers arrive. Once the engineers have performed the install, the deployment VM 422 will be destroyed, thus reducing the risk of leaving assets behind in the customer infrastructure 404.

It should be appreciated by those of skill in the art that in the examples discussed above, the IT services provider is well-positioned to provide additional assistance to the customer. In general, the techniques discussed above allow the IT services provider to deploy assets (e.g., VMs) into the customer's environment on an as-needed basis, and to be poised to provide additional services without any delay.

Example Avatar Device

Figure 5:
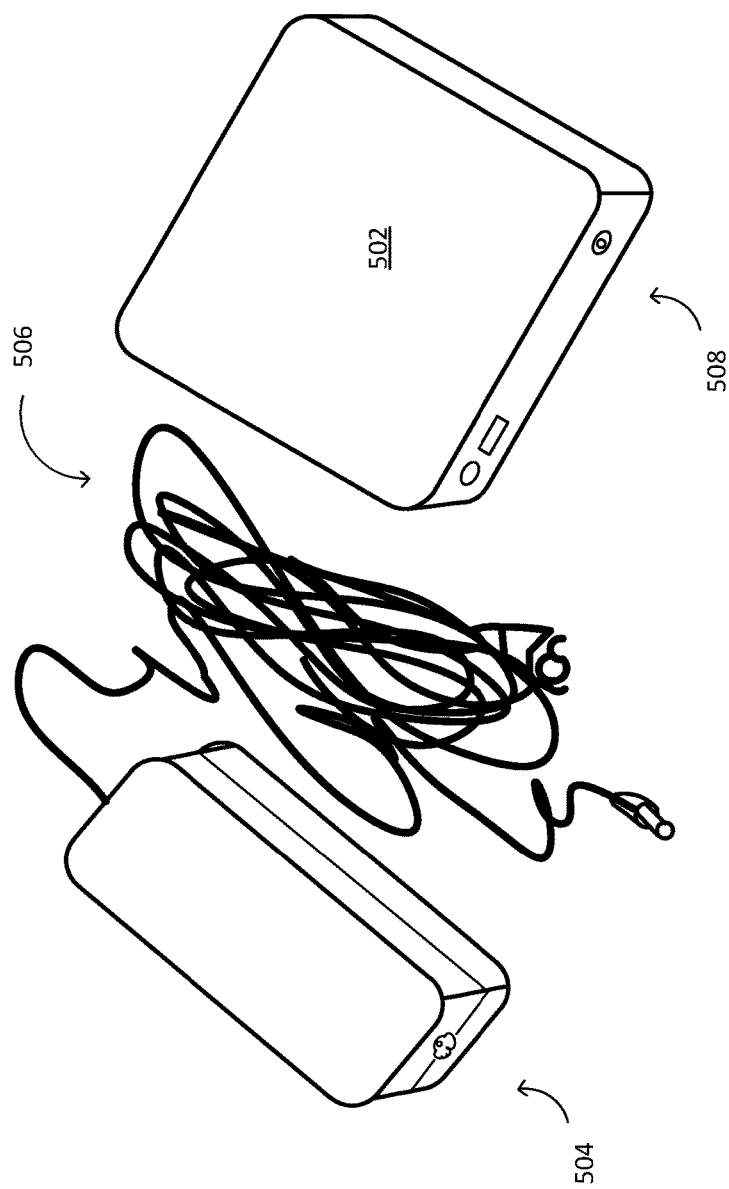
FIG. 5 depicts an exemplary avatar device.

FIG. 5 depicts an exemplary physical avatar 502. The avatar 502 may correspond to the avatar 104, the avatar 210, and/or the avatar depicted in the customer infrastructure 304-A of FIG. 3. The avatar 502 may include a power supply 504, a set of data transfer and power cables 506, and a set of hardware ports 508. However, as noted above, in other embodiments the avatar may be a VM (i.e., composed of software). The power supply 504 may include a direct current (DC) and/or alternating current (AC) power supply suitable for the electric power requirements of the avatar 502. The set of data transfer and power cables 506 may include any suitable cabling (e.g., 2-wire, 4-wire, Ethernet cables, USB cables, HDMI cables, etc.). The set of hardware ports 508 may include one or more suitable power and/or data transmission ports, including without limitation RJ-45 connector ports (e.g., Ethernet ports), AC/DC power ports, HDMI ports, USB ports, etc. In hardware embodiments, the avatar 502 may be of any suitable dimensions, and may be implemented using any suitable computing device(s) (e.g., a laptop, a server, a tablet, a mobile computing device, etc.). The physical avatar 502 may be a relatively low-powered device, in some embodiments, such as a thin client, internet-of-things device, etc.

Example Provisioning User Interface

Turning to FIG. 6A, an example user interface 600 is depicted for provisioning IT services management tunnels. The user interface 600 may include a shell application including a configuration script 602 for building tunnels between the IT services provider and a customer. The shell application and configuration script may be implemented using any suitable operating system, programming language, and/or development frameworks. Although a command-line tool is depicted, in some embodiments, the shell application and/or configuration script may be web-based tools, a mobile application, etc.

The script 602 may include a plurality of flags for performing various actions regarding tunnels. For example, the script 602 may include a plurality of flags 604 for starting, restarting and displaying the status of a tunnel, wherein each flag in the plurality of flags 604 may include one or more additional parameters, wherein the additional parameters are depicted as hyphenated parameter names. For example, the plurality of flags may include parameters for specifying a customer, a BMN, an instance, and/or a tunnel to which the flag will be applied. Other flags may include authenticate/deauthenticate flags for, respectively, confirming and revoking the authentication status of a tunnel; a daemon flag for running the script 602 as a background process, a pause and unpause command for temporarily halting a tunnel, a refresh flag for reestablishing the tunnel, a remove flag for removing the tunnel, a cancel flag for canceling data sent in a tunnel, and a forward flag for setting a forwarding status. Each of the flags may be associated with different optional parameters. The parameters corresponding to each flag may include —key=value parameters and/or —key parameters.

FIG. 6B depicts an example of executing the script 602 with a series of arguments 606. The series of argument 606 include a status flag, an abbrev parameter, a bmn_name parameter, and a tunnel parameter. The status flag corresponds to a set of instructions that, when executed, cause the status of one or more BMN to be retrieved and displayed as output 608. The remainder of the arguments 606 may filter the output 608 to display only those of a particular customer (e.g., pmlab), a particular BMN by name (e.g., bmn03), wherein the instance is of type tunnel. The arguments 606 may be used to construct an efficient query, and to avoid returning a large data set. Each line in the output 608 depicts a link that may correspond to the tunnels discussed above. In some embodiments, each line in the output 608 may correspond to the communication links 208-A and/or the communication links 208-B of FIG. 2. Each line may correspond to a bidirectional tunnel between a BMN (e.g., a BMN with the hostname pmlab-s-bmn03) and an avatar device. Each column of the output 608 may include information relating to the tunnel.

For example, the instance column may correspond to the name of a virtual network kernel interface (e.g., a TUN or TAP device). In general, virtual network kernel interfaces/virtual network interface controllers (VNICs) are abstract network interfaces that provide packet reception and transmission for user space programs. They may be configured as point-to-point and/or Ethernet devices that receive packets from a user space program and/or send packets via a user space program. To the operating system, a TUN/TAP device appears and behaves the same as a physical interface, in that the assignment of IP addresses, routing, gateways, and firewall rules work as they do with respect to physical devices. However, by using VNICs, a large number of network devices may be emulated (e.g., thousands or more). When an avatar such as avatar 104 is delivered as a virtual appliance (e.g., a virtual machine) a VNIC may be used to provide a network interface for the virtual machine that is able to communicate with a host operating system. Importantly, VNICs allow packets to be exchanged in both IP (e.g., IPv4 and/or IPv6 protocols) and/or via raw Ethernet packets. A cryptographic network protocol (e.g., SSH) may be used to secure the packets transmitted via the VNIC. The output 608 includes the process identifier (PID) of an SSH process used to encrypt packets exchanged via the links depicted in output 608. In some embodiments, more than one SSH process may be used.

FIG. 6C displays the configuration of the VNIC tun6 depicted in FIG. 6B. In FIG. 6C, an ifconfig command is used to display a configuration 612 of VNIC tun6. The configuration 612 includes an IP address corresponding to the VINC tun6 of 172.20.16.14, corresponding to the LOCAL_SOCKET_ADDR displayed in FIG. 6B. A point-to-point (P-t-P) address of 172.20.16.15 is also displayed, corresponding to the BMN_SOCKET_ADDR displayed in FIG. 6A. FIG. 6C also includes an END_SYSTEM_SOCKET_ADDR column, which indicates the IP address and/or CIDR block to which the tunnel refers. In general, the LOCAL_SOCKET_ADDR socket is an IP address of a local NIC (e.g., NIC 102C), which may be a physical NIC or a VNIC, and the BMN_SOCKET_ADDR is a point-to-point IP address, and the END_SYSTEM_SOCKET_ADDR is the IP address of the corresponding end system. Generally the local socket address and BMN socket address are located in the IT services provider's environment (e.g., in the remote computing device 102) whereas the end system socket address(es) are located at the customer's environment (e.g., a set of network addresses within the customer infrastructure 304-A). As can be seen in FIG. 7, the end system socket address that may be bound to a remote host may correspond to a plurality of popular services, such as SSH (port 22), HTTP/HTTPS (ports 80 and 443 respectively), SMTP (port 25), etc. Importantly, when a user attempts to connect to these ports, the connections are transparently passed through to the BMN, as depicted. Each row of the table in the output 608 corresponds to a routing rule of a routing database (e.g., from the electronic database 110-B of FIG. 1). In other embodiments, routing information may be stored in another location within system 100.

In some embodiments, the user interface 600 may be implemented using other computer interface designs. For example, the user interface 600 may be implemented as a web interface, wherein a user may access the user interface 600 via a web browser, an application in a mobile computing device, a desktop application, etc. A web user interface 600 may use the script 602 through a translation layer (not depicted). For example, the user interface 600 may be implemented as a web application installed in an HTTP server of a computing device such as the remote computing device 102. A user may access the web application via a web browser. The HTTP server of the computing device may render web pages to the user via the web browser which correspond to the output of the script 102, and which accept inputs corresponding to the script 102. For example, the user may create, start, restart, and terminate a tunnel by accessing a web page displaying a list of tunnels. The server may provide web-based functionality for any of the operations supported by the script 602.

Example Routing Database

FIG. 7 depicts a table 700 of a routing database. The routing database and table 700 may be included in a database of the IT services provider, such as database 110-A of FIG. 1. The table 700 may include many (e.g., tens of thousands) of routing rules (i.e., individual rows) corresponding to one or more customer. The routing rules may be grouped by column (e.g., a BMN column 702-A). Different customers may have the same IP addresses within their respective networks, and the BMN column 702-A may be used to disambiguate between the different customers. That is, a combination of BMN column 702-A plus socket is a unique combination within the table 700. Herein, a "socket" may include a combination of an IP address and a port number. An INSTANCE column 702-B of the table 700 may be used to group services in the customer's environment. For example the rows in table 700 wherein column 702-B is 1 may be a set of web servers, whereas the rows wherein column 702-B is 255 may be operating system patch servers, etc. A column 702-C may indicate the status of the corresponding instance in 702-B, and a column 702-D may indicate the SSH process handling encryption of the tunnel, as discussed with respect to FIG. 6B. A set of columns 702-E, 702-F, 702-G, and 702-H may indicate sockets associated with the tunnels in table 700 as discussed with respect to FIG. 6A and FIG. 6B. Note that the last three lines of FIG. 7 correspond to the lines in output 608 of FIG. 6B.

In operation, rows may be programmatically added to table 700 by the IT services provider using a configuration tool, such as the configuration script 600. Rules may be executed when rows are added and/or deleted from the table 700 that automatically create routing rules in the IT services provider environment and/or the customer environment. For example, the application 102-G and/or the database 110-A may include instructions that trigger various network configuration operations (e.g., create firewall rules, port forwarding rules, create/destroy tunnels, etc.) when the table 700 is modified. In this way, an operator at the IT services provider may merely modify the table, and the rules may be automatically propagated to local devices and the customer's devices. Many flexible configurations are envisioned.

For example, the customer may have a Microsoft Windows computer located in the customer's computing environment, such as one of the customer devices depicted in the customer infrastructure 404 of FIG. 4. The Windows computer may need to retrieve patches periodically for the purpose of securing and/or updating the operating system. The IT services provider may want to manually initiate such an update on behalf of the customer in performance of the IT services provider's duties under an IT services contract. As discussed above, historically, the IT services provider would need to contact the customer via telephone, email or some other means to request that the customer adjust the customer's firewall rules to allow the Windows computer to access a patch server. The patch server may be provided by a Microsoft, for example, or by the IT services provider. Traditionally, in a large corporation, the IT services provider may need to constantly contact the customer with such firewall management requests, which may prove burdensome over time and strain the resources of the customer.

Referring again to FIG. 7, the present techniques allow the IT services provider to add a new row to the table 700, without the need to involve the customer at all, or to access any particular devices in the customer's infrastructure. For example the IT services provider may add a new line which includes a BMN of the customer, a local socket address corresponding to the Windows patch server, and an end system socket address corresponding to the customer's Windows computer needing upgrades/patching. When the Windows computer seeks to connect to a patch server, a request is forwarded by the avatar in the customer's environment to the customer's BMN at a particular port number, and wherein the BMN then forwards the request to a patch server. The table 700 provides for both forward and reverse proxying, wherein forward proxying allows the IT services provider to access the customer's environment, and reverse proxying allows the customer to access services provided by the IT services provider, as discussed with regard to the patching server example. It should be appreciated that many other centrally-managed systems are possible. These include monitoring, email services, etc. The IT services management provider may locate the managed systems in any suitable management environment, such as in different data centers selected from data center 202-1 through data center 202-l.

The present techniques allow thousands of firewall rules to be determined in a central port forwarder (e.g., central port forwarder 302-D), wherein the firewall rules are driven by the routing database and are not manually programmed. Aspects of the present invention (e.g., the application 102-G) may include instructions that when executed analyze the table 700 and heal any broken rules. For example, a rule having an end system socket address that is nonexistent in the customer's infrastructure may be pruned from the database. As applications are added to the BMN of the customer, rules may be automatically generated.

In some embodiments, the services that the IT services provider publishes for the customer's access via reverse proxying techniques may allow access to the Internet. For example, a third-party company device (e.g., a Cisco Smart Net Total Care appliance) may be configured to forward connections to the customer's BMN, wherein the BMN is also configured to forward requests to the third-party company.

Additional Example Embodiments

In an embodiment, the present techniques enable the IT services provider to project resources into the customer's environment. For example, the customer may opt in to IT services management and, as discussed above, a hardware or software appliance may be deployed by the customer. The avatar, which may be an avatar device as described above, may include instructions that when executed enumerate other devices in the customer's environment by probing the customer's network infrastructure. As long as the customer has an active service contract with the IT services provider, the avatar may remain in place. The IT services provider may develop a new service. The new service may be deployed to the customer, as well as a set of other customers who have similar service contracts. Some of the service contracts include field services, long-term service engagement, and temporary service engagements. For example, when engineers go on vacation, other engineers may take over for the vacationing engineers without the need to provide physical access to the other engineers.

In some embodiments, third parties may be provided via the present techniques. For example, the IT services provider may contract with a third party that provides a third party service. The third-party service may be a specialized service that is a branded service. As discussed with respect to FIG. 4D, the third-party service may be a service that is a licensed software tool. In other embodiments, the third-party service may be a web service or API. In each case, the third-party service may be provided for access to the customer via a tunnel, and to the customer, the third-party service may appear identical to and/or indistinguishable from services provide by the IT services provider directly.

In some embodiments, the present techniques may allow unified communication. For example, the IT services provider may traditionally permit field engineers to download field tools to devices that they use to service customer devices. The field tools may accept input particular to the customer from engineers, and may then build a specific software package for the customer. Unfortunately, historically, individual field tools must be maintained for each separate software platform (i.e., separate tools for Windows, Linux, Mac OSX, etc.), adding expense and delay. Using the present techniques, tunnels may be developed to allow field engineers to use field tools via a tunnel, and to deploy the software package for the customer's access via a link between the IT services provider's computing environment and the customer's computing environment. When the customer wants to access the software package, the customer may access the software package. In this way, development resources are optimized, and the field tools are always current and create builds with the latest software. Also, the field tools remain in the IT services provider's control, obviating some security issues and allowing the software to be managed at scale. Once the customer has accessed the software package, the customer's access can be deactivated. The tools that the field engineers need to be included in their devices are also reduced.

In an embodiment, the present techniques enable the IT services provider to monitor software installed in the customer's computing environment for software licensing purposes. For example, a VM of the customer may include a set of licensed software. The IT services provider may query the customer's environment in real-time and may determine that the licensed software is present from the environment, or a list of which software is present. In some embodiments, the IT services provider may transmit a list of customer equipment and/or licensed software to a third-party licensor. The IT services provider may receive from the third-party licensor an indication of whether the equipment and/or licensed software is under warranty, is at its end-of-life, and/or contains any security vulnerabilities. Based on the indications, the IT services provider may query a database of available upgrades, and may transmit an indication to the customer identifying the available upgrades. The customer may be allowed to select one or more upgrades to be automatically applied to the customer's computing environment by the IT services provider via the present techniques. In some embodiments, an overall health of the customer's environment may be determined by the IT services provider. The health may be expressed as a percentage, such as the percentage of devices and/or software within the customer's environment that are currently supported. The IT services provider may generate sales opportunities by providing the customer with a report of the health, along with recommendations for increasing the health of the environment.

In some embodiments, the ability of the IT services provider to enumerate the devices and software in the customer's environment in real-time may allow the IT services provider to track end-of-sale, end-of-life, out of warranty, and product recall information. The IT services provider may also analyze the customer's environment to facilitate support contract renewal. Further, all of the information related to analyzing the customer's computing environment may reside in systems controlled by the IT services provider, such as the remote computing device 102. The remote computing device 102 may be a monitoring collector. The monitoring collector may retrieve information relating to the attributes of computers in the customer's environment (e.g., that a hard drive of a laptop computer is 95% full) for equipment inventory and/or remediation. The monitoring collector may retrieve data (e.g., a serial number, part number, etc.) via the BMN. In this way, the monitoring collector may be separated from critical customer infrastructure that is directly or indirectly communicating with the customer's environment. Such separation allows data retrieved by the monitoring collector to be stored indefinitely, and allows for the computational resources of the monitoring collector to be adjusted independent of the BMN.

In some embodiments, the present techniques allow the IT services provider to perform security audits/assessments, such as by scanning the customer's computing environment and the computing devices therein. Billing services may be provided, and the IT services provider may analyze applications in the customer's environment to determine the computing resources necessary for executing the applications. The present techniques also allow the IT services provider to provide managed services on behalf of third parties that would otherwise not be large enough to justify the IT services provider making an investment in training and maintaining dedicated employees.

In an embodiment, the IT services provider may send data received from the monitoring server to a vendor. The vendor may compare the data to a subscriptions database to determine a validity of a product, service, software, and/or hardware asset. The vendor may transmit an indication of the validity to the IT services provider, and the IT services provider may take an action based on the validity, such as revoking access, transmitting an upgrade recommendation, etc. In some cases, the vendor may provide an oracle to the IT services provider which analyzes the data received from the monitoring server to automatically determine the validity. The ability of the IT services provider to inspect the customer's environment is beneficial for other reasons. For example, the IT services provider may identify orphaned hardware (e.g., a forgotten switch or a router demo).

In general, the present techniques allow traditional IT services providers to move to a more consumer-like experience for their customers. Traditionally, IT services provision has necessitated heavy infrastructure implementation. As noted, using the present techniques, customers may now sign up for trial IT services. The present techniques achieve efficiency and cost-effectiveness by productizing IT services, and allowing customers to click through a few screens and enter information in a fully-automated way, including receiving via postal mail or an electronic download, a customized avatar device, wherein the customer never has to speak to a human at the IT services provider.

In some cases, the IT services provider may restrict the products and services that a customer may purchase via automated export controls. And in some embodiments, the BMN may be collocated. For example, although the BMN was described as being part of the IT service provider infrastructure 302 in FIG. 3, for example, certain applications may necessitate high message/packet rates (e.g., firewall logging). In such cases, the BMN in the customer service region 302-A may be relocated to the customer infrastructure 304-A, and/or a second BMN may be used to balance the load. For example, certain traffic may be sent to a collocated BMN.

Generally, a business problem solved by the present techniques is delivery of services remotely, in a less capital intensive, faster, and easier to provision way, which allows customers to try the services before purchasing. The IT services manager's need to worry about hardware/intellectual property in field is removed via increased automation and more intelligent arrangement and configuration of resources. The customer may only need to implement one virtual or physical appliance in their environment wherever the customer desires. This may be highly desirable to customers, who are accustomed to traditional IT services provider offerings that require invasive changes to the customer environment. Here, the customer may need only open a pair of secure ports, and all management, logging, traffic analysis, etc. may be facilitated via one connection. This drastically lowers the friction required for a customer to facilitate services IT management, and automates customer setup and ongoing maintenance.

In an embodiment, a particular service may be provided to one or more computers in the customer environment 304-A by the IT services provider. For example, a computer within the customer infrastructure 206-2 may require access to Network Time Protocol (NTP), whereby a clock within the computer is automatically set, to adjust for clock drift. The IT services provider may enable one or more Global Positioning System (GPS) NTP time sources in one or more respective data centers (e.g., in one or more of data centers 202-1 through 202-*l*). The IT services provider may execute the script 602, providing a —forward flag, a —bmn_name corresponding to one of the customer's BMNs, and an —instance flag representing the instance number of a client application (e.g., an NTP client), wherein the client application is executing in the computer within the customer infrastructure 206-2. The two or more data centers may be respectively located in any suitable location (e.g., in different regions of the United States and/or outside the United States). The call to the script 602 may also include a —remote_port flag and parameter (e.g., 123) specifying a remote port, a —remote_ip flag and parameter (e.g., 1.2.3.4) specifying a remote IP address, and a —listening_port and parameter (e.g., 123).

The script 602 may then insert a row into a routing table (e.g., the table 700). Next, instructions executing in a central port forwarder corresponding to the remote computing device 102 (e.g., the central port forwarder 302-D) may retrieve the new row from the routing table. The central port forwarder may configure a firewall rule in the operating system-level routing table of the central port forwarder and/or an avatar device in the customer infrastructure 206-2 based on the new row. In some embodiments, the central port forwarder may ignore the new row unless and until the —ctivate flag is passed to the script 602. The computer within the customer infrastructure 206-2 may be configured to have the —remote_ip of 1.2.3.4 as the NTP server in the configuration of the NTP server. The remote IP may correspond to the IP address of the BMN or the avatar. The time of the two NTP time sources may be pushed to a first layer host that all BMNs synchronize to (e.g., a computer in customer service region 402). When the computer within the customer infrastructure 206-2 sends a request for the current time to remote IP 1.2.3.4 at port 123, the request may be routed by the avatar and/or the central port forwarder to the BMN. A response including the time may be pushed from the BMN back to the computer within the customer infrastructure 206-2 using the forward and reverse proxying techniques discussed above. It should be appreciated that access to many other services implemented in the BMN is envisioned, including TACACS, RADIUS, logging services, monitoring services, etc.

The techniques of automating IT services management described herein provide an IT services management provider with the ability to remotely install, configure, reconfigure, deploy, and/or decommission IT services (e.g., software, hardware, VMs, databases, etc.). The system and method may provide an IT services management provider with a fully automated way to handle support and new service requests from customers, and to deploy resources (e.g., engineers, services, etc.) to customers on demand. The method and system may further allow an IT services management provider to customize VMs to deliver licensed software on demand, and to provide access to third-party resources, without resorting to ad hoc customization. As such, it is no longer necessary for the IT services management to reengineer a service for every customer of that service.

Example Method

Figure 8:
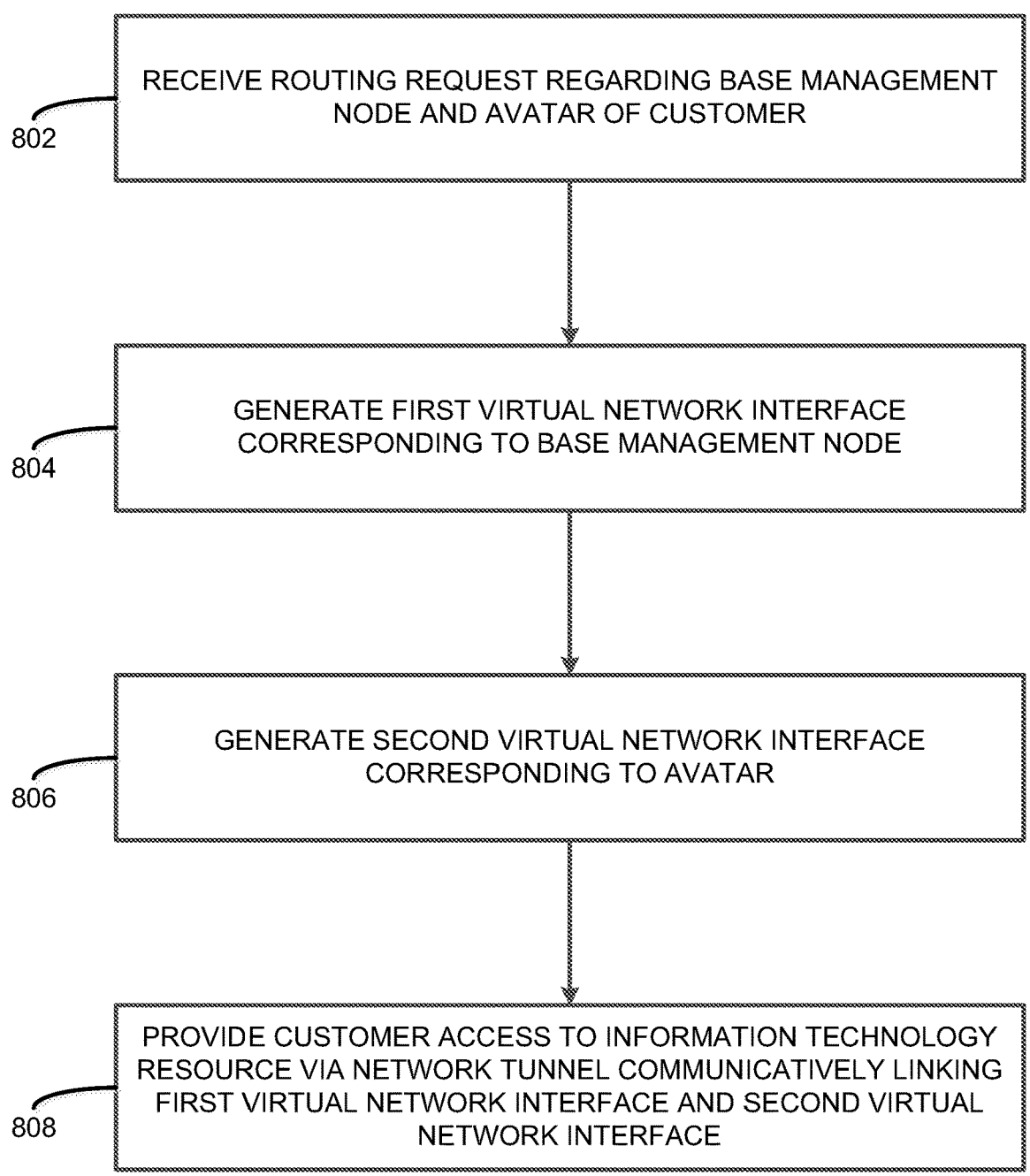
FIG. 8 depicts an exemplary flow diagram.

FIG. 8 depicts an example method 800 for providing an information technology resource. The method 800 may include receiving a routing request with respect to a base management node of a customer and an avatar of a customer (block 802). The routing request may correspond to a user command to create a tunnel and/or forwarding rule, such as via the script 602. However, in some other embodiments, the routing request may be entered in other ways, such as via a mobile application used by an administrator. The method 800 may further include generating a first virtual network interface (VNIC) corresponding to the base management node (block 804). The first VNIC may be an IP or Ethernet VNIC, as discussed with respect to FIG. 2. The method 800 may further include generating a second VNIC corresponding to the avatar, the first virtual network interface and the second virtual network interface communicatively coupled by a network tunnel (block 806). The second VNIC may be added to an existing VM, or may be generated during the creation of a VM including the second VNIC. For example, an avatar may be already installed at a customer location, and the second VNIC may be assigned by instructions executing in the avatar or based on instructions received from another source, such as the remote computing device 102. The method 800 may include providing, via the network tunnel, the customer with access to the information technology resource (808). As noted above, a resource may be a software, hardware, and/or human asset.

As discussed, in some embodiments the avatar may be a hardware-based avatar, and the VNIC may be created via instructions installed in the hardware-based avatar. For example, a set of network scripts may be executed at the time the avatar boots up, wherein the network scripts create the second VNIC. In some embodiments, the method 800 may include instructions for deploying the VM to a cloud computing platform. An encryption protocol may be used in conjunction with the VNICs to secure the tunnel, and once the avatar device is running in the customer infrastructure, the avatar may query aspects of the customer infrastructure to determine validity of resources therein, and may transmit the validity via the tunnel to the IT services provider.

Additional Considerations

The following considerations also apply to the foregoing discussion. Throughout this specification, plural instances may implement operations or structures described as a single instance. Although individual operations of one or more methods are illustrated and described as separate operations, one or more of the individual operations may be performed concurrently, and nothing requires that the operations be performed in the order illustrated. These and other variations, modifications, additions, and improvements fall within the scope of the subject matter herein.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" is employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for implementing the concepts disclosed herein, through the principles disclosed herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed:

1. A computer-implemented method of facilitating access to one or more information technology services, comprising:
receiving, from a customer, a selection of one or more information technology services of an information technology services provider;
initializing a machine avatar in a computing environment by analyzing the information technology services;

establishing a network tunnel between the machine avatar and a base management node that runs services of the customer;

analyzing, via the machine avatar of the customer, a computer network of the customer to generate a validity of at least one aspect of the customer's computing environment;

transmitting, based on the validity, a recommendation for improving the customer's computing environment to the customer; and receiving, via the network tunnel, network traffic of the customer addressed to the selected information technology services.

2. The method of claim 1, wherein the machine avatar of the customer includes a virtual machine.

3. The method of claim 2, further comprising:
generating a virtual network interface corresponding to the machine avatar includes generating the virtual machine.

4. The method of claim 3, wherein generating the virtual machine includes deploying the virtual machine in a cloud computing platform.

5. The method of claim 1, wherein the network tunnel includes a point-to-point tunnel.

6. The method of claim 1, wherein the network tunnel includes an Ethernet tunnel.

7. The method of claim 1, further comprising:
encrypting, via one or more processors, information transmitted via the network tunnel.

8. The method of claim 1, further comprising:
transmitting the machine avatar of the customer to the customer; and
executing, via one or more processors, an initialization routine in the machine avatar.

9. The method of claim 1, further comprising:
receiving a subscription request corresponding to a licensed asset;
provisioning, based on the subscription request, an instance of the licensed asset; and
providing, via the network tunnel, the customer with access to the instance of the licensed asset.

10. A computing system comprising:
one or more processors; and
memory storing instructions that, when executed by the one or more processors, cause the computing system to:
receive, from a customer, a selection of one or more information technology services of an information technology services provider;
initialize a machine avatar in a computing environment by analyzing the information technology services;
establish a network tunnel between the machine avatar and a base management node that runs services of the customer;
analyze, via the machine avatar of the customer, a computer network of the customer to generate a validity of at least one aspect of the customer's computing environment;
transmit, based on the validity, a recommendation for improving the customer's computing environment to the customer; and
receive, via the network tunnel, network traffic of the customer addressed to the selected information technology services.

11. The computing system of claim 10, wherein the instructions further cause the computing system to:
generate one or more virtual machine.

12. The computing system of claim 11, wherein the instructions further cause the computing system to:
deploy the one or more virtual machine in a cloud computing platform.

13. The computing system of claim 10, wherein the network tunnel includes a point-to-point tunnel.

14. The computing system of claim 10, wherein the network tunnel includes an Ethernet tunnel.

15. The computing system of claim 10, wherein the instructions further cause the computing system to:
encrypt data sent via the network tunnel; and
decrypt data received via the network tunnel.

16. A non-transitory computer readable medium containing program instructions that when executed, cause a computer to:
receive, from a customer, a selection of one or more information technology services of an information technology services provider;
initialize a machine avatar in a computing environment by analyzing the information technology services;
establish a network tunnel between the machine avatar and a base management node that runs services of the customer;
analyze, via the machine avatar of the customer, a computer network of the customer to generate a validity of at least one aspect of the customer's computing environment;
transmit, based on the validity, a recommendation for improving the customer's computing environment to the customer; and
receive, via the network tunnel, network traffic of the customer addressed to the selected information technology services.

17. The non-transitory computer readable medium of claim 16, including further program instructions that, when executed cause a computer to:
instantiate a virtual machine, start a virtual machine, stop a virtual machine, suspend a virtual machine or de-allocate a virtual machine.

18. The non-transitory computer readable medium of claim 16, including further program instructions that, when executed, cause a computer to:
identify, by querying a computer network accessible via a virtual network interface, a validity of an asset;
transmit, via the network tunnel, the validity of the asset.

19. The non-transitory computer readable medium of claim 16, including further program instructions that, when executed, cause a computer to:
receive a set of initialization data from a routing table of a database.

* * * * *